(12) United States Patent
Bell, Jr. et al.

(10) Patent No.: US 7,003,186 B2
(45) Date of Patent: Feb. 21, 2006

(54) WAVEGUIDE-BASED OPTICAL INTERFEROMETER

(75) Inventors: Raymond Mark Bell, Jr., Redwood City, CA (US); Patrick Elliott Perkins, Sunnyvale, CA (US); Lawrence Lowell Ames, San Jose, CA (US); William Walter Anderson, Half Moon Bay, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 276 days.

(21) Appl. No.: 10/680,720

(22) Filed: Oct. 6, 2003

(65) Prior Publication Data

US 2005/0168752 A1 Aug. 4, 2005

Related U.S. Application Data

(63) Continuation-in-part of application No. 10/051,122, filed on Jan. 22, 2002, now Pat. No. 6,947,621.

(51) Int. Cl.
*C02B 6/26* (2006.01)
*G01B 9/02* (2006.01)

(52) U.S. Cl. ........................................ 385/15; 356/482
(58) Field of Classification Search ............ 385/14–16, 385/31, 39, 41, 50, 147; 356/482, 483
See application file for complete search history.

(56) References Cited

U.S. PATENT DOCUMENTS

| | | | |
|---|---|---|---|
| 3,977,787 A * | 8/1976 | Fletcher et al. ............ 356/451 |
| 4,814,829 A | 3/1989 | Kosugi et al. |
| 4,834,540 A | 5/1989 | Totsuka et al. |
| 4,907,886 A | 3/1990 | Dandliker |
| 4,912,530 A | 3/1990 | Bessho |
| 5,694,216 A | 12/1997 | Riza |
| 5,767,972 A | 6/1998 | Demarest |
| 5,784,161 A | 7/1998 | Bechstein et al. |
| 6,008,902 A | 12/1999 | Rinn |
| 6,141,086 A | 10/2000 | Vahala et al. |
| 6,163,379 A * | 12/2000 | de Groot ................ 356/493 |
| 6,236,507 B1 * | 5/2001 | Hill et al. ................ 359/494 |
| 6,240,235 B1 | 5/2001 | Uno et al. |
| 6,243,168 B1 | 6/2001 | Heflinger et al. |
| 6,542,682 B1 * | 4/2003 | Cotteverte et al. .......... 385/125 |
| 6,559,926 B1 | 5/2003 | Yamaguchi et al. |
| 6,676,878 B1 | 1/2004 | O'Brien et al. |
| 6,785,433 B1 * | 8/2004 | Tiefenthaler ............... 385/12 |
| 2001/0028461 A1 * | 10/2001 | Hill et al. ................. 356/493 |

(Continued)

OTHER PUBLICATIONS

J. D. Trolinger, "Ultra High Resolution Interferometry", Proc. SPIE vol. 2861, pp. 114-123 (1996).

(Continued)

*Primary Examiner*—Akm Enayet Ullah
(74) *Attorney, Agent, or Firm*—McDermott Will & Emery LLP

(57) ABSTRACT

Techniques for measuring spatial locations. An apparatus for measuring spatial locations includes a first object at a first location, a second object at a second location, and a waveguide-based interferometer coupled between the first object and the second object. The waveguide-based interferometer includes a waveguide material. The waveguide material is adapted to carry at least a reference beam and a measurement beam. The reference beam traverses a first path defined within the waveguide material. The measurement beam traverses a second path defined within the waveguide material and a third path defined outside of the waveguide material. The third path is related to at least one of the first location and the second location.

35 Claims, 18 Drawing Sheets

U.S. PATENT DOCUMENTS

2003/0223674 A1    12/2003    Bell et al.

OTHER PUBLICATIONS

M. Kawachi, "Silica Waveguides on Silicon and Their Application to Integrated-Optic Components", Optical and Quantum Electronics, vol. 22, pp. 394-416 (1990).

T. Kobayashi, et al, "Optical FM Heterodyne Interferometry for Range and Displacement Meausrements", CPEM '88 Digest, pp. 133-134 (1998).

M. Tanaka, et al., "Linear Interpolation of Periodic Error in a Heterodyne Laser Interferometer at Subnanometer Levels", IEEE Trans. Inst. & Meas., vol. 38, pp. 552-554 (1989).

M. Tanaka, et al., "Linear Interpolation of Periodic 633nm in Heterodyne Laser Interferometer for Subnanometer Dimensional Meausrement", CPEM '88 Digest, pp. 131-132 (1988).

C. Tuttle, "A Testbed for a Fiber-Optic Based laser Metrology Gauge", Aug. 20, 2002, Interferometry in Space, Proceedings of SPIE vol. 4852, pp. 717-730 (2003).

Laser Interferometers/Encoders & Laser-Based Callibration Systems: Laser Interferometer Position Systems Product Catalog, pp. 538-539 (1995).

"Optics and Laser Heads for Laser-Interferometer Position Systems" Product Overview, Agilent Technologies (1995).

* cited by examiner

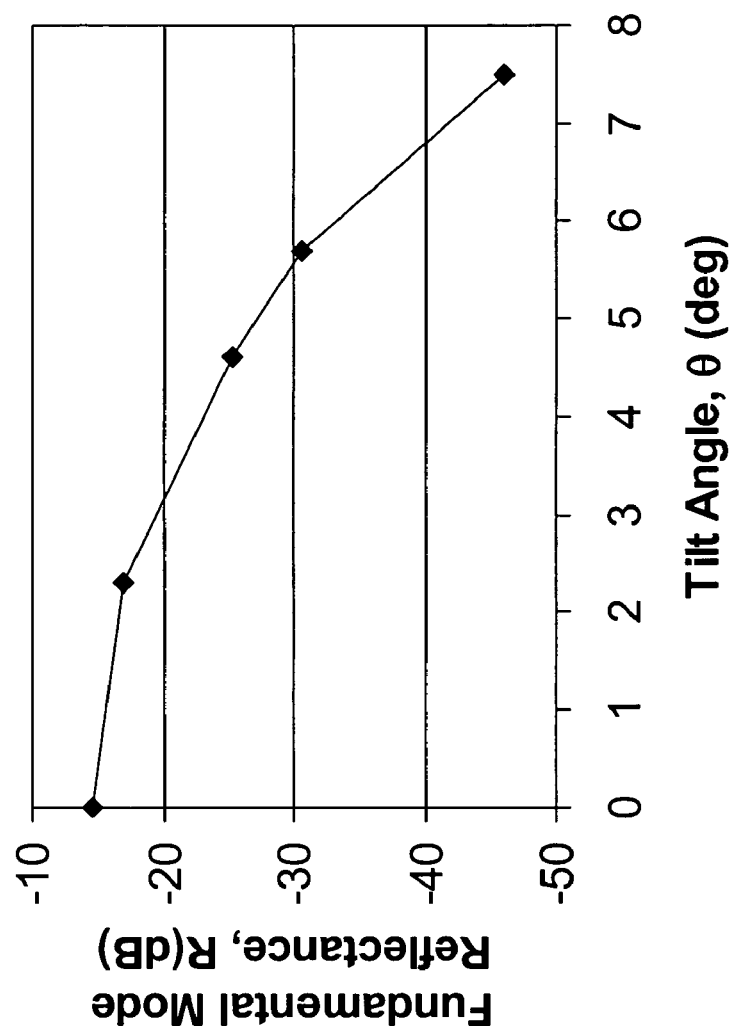
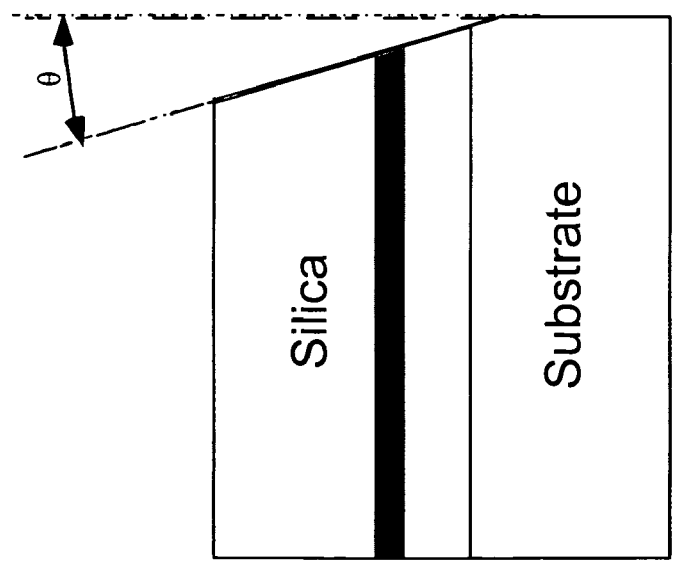
FIGURE 9

WAVEGUIDE-BASED OPTICAL INTERFEROMETER

CROSS-REFERENCES TO RELATED APPLICATIONS

This application is a continuation-in-part application to U.S. application Ser. No. 10/051,122 filed Jan. 22, 2002, now U.S. Pat. No. 6,947,621, which is incorporated by reference herein.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

The present invention relates generally to interferometer techniques. More particularly, the invention provides a method and system for using waveguide in an interferometer. Merely by way of example, the invention has been applied to measuring spatial locations, but it would be recognized that the invention has a much broader range of applicability.

Interferometers have been widely used for spatial measurements. The interferometers include homodyne interferometers, such as conventional Michelson interferometer, and heterodyne interferometers. Homodyne interferometers use laser beams at the same frequency, while heterodyne interferometers use laser beams at different frequencies.

Interferometers measure the phase of a continuous signal for as long as the signal remains stable over all portions of a reference path and a measurement path. The major practical problem with high resolution interferometry is that changes of optical path-lengths in the system, including ones that are not intended, are measured. After optical beams are split in the interferometer, movement of optical components, especially mirrors, add or subtract optical path-length from one of the two beams separately, resulting in a signal that is unrelated to the measurement. Therefore, stability of optical components in the separate legs of the interferometer is usually important. See J. D. Trolinger, *Ultra High Resolution Interferometry*, Proc. SPIE Vol. 2816, pp. 114–123 (1996).

Hence, it is desirable to improve interferometer techniques.

BRIEF SUMMARY OF THE INVENTION

The present invention relates generally to interferometer techniques. More particularly, the invention provides a method and system for using waveguide in interferometer. Merely by way of example, the invention has been applied to measuring spatial locations, but it would be recognized that the invention has a much broader range of applicability.

According to a specific embodiment of the present invention, an apparatus for measuring spatial locations includes a first object at a first location, a second object at a second location, and a waveguide-based interferometer coupled between the first object and the second object. The waveguide-based interferometer includes a waveguide material. The waveguide material is adapted to carry at least a reference beam and a measurement beam. The reference beam traverses a first path defined within the waveguide material. The measurement beam traverses a second path defined within the waveguide material and a third path defined outside of the waveguide material. The third path is related to at least one of the first location and the second location.

According to another embodiment of the present invention, an apparatus for measuring spatial locations includes a first object at a first location, a second object at a second location, and a waveguide-based interferometer coupled between the first object and the second object. The waveguide-based interferometer includes a waveguide material. The waveguide material is adapted to carry at least a reference beam at a reference frequency and a corresponding reference wavelength and a measurement beam at a measurement frequency and a corresponding measurement wavelength. The reference frequency is different from the measurement frequency. The reference beam traverses a first path defined within the waveguide material. The measurement beam traverses a second path defined within the waveguide material and a third path defined outside of the waveguide material. The third path related to at least one of the first location and the second location.

According to yet another embodiment of the present invention, an apparatus for measuring spatial locations includes a first object at a first location, a second object at a second location, and a waveguide-based interferometer coupled between the first object and the second object. The waveguide-based interferometer includes a waveguide material. The waveguide material is adapted to carry at least a first reference beam at a first frequency and a corresponding first wavelength, a second reference beam at a second frequency and a corresponding second wavelength, a first measurement beam at the first frequency and the corresponding first wavelength, and a second measurement beam at the second frequency and the corresponding wavelength. The first frequency is different from the second frequency. The first reference beam traverses a first reference path defined within the waveguide material. The second reference beam traverses a second reference path defined within the waveguide material. The first measurement beam traverses a first measurement path defined within the waveguide material and an external path defined outside of the waveguide material. The external path is related to at least one of the first location and the second location. The second measurement beam traverses a second measurement path defined within the waveguide material. The first measurement path and the first reference path have a first common end. The second measurement path and the second reference path have a second common end.

According to yet another embodiment, an apparatus for measuring spatial locations includes a first object at a first location, a second object at a second location, and a waveguide-based interferometer coupled between the first object and the second object. The waveguide-based interferometer includes a waveguide material. The waveguide material is adapted to carry at least a first reference beam at a first frequency and a corresponding first wavelength, a second reference beam at a second frequency and a corresponding second wavelength, a first measurement beam at the first frequency and the corresponding first wavelength, and a second measurement beam at the second frequency and the corresponding wavelength. The first frequency is different from the second frequency. The first reference beam traverses a first reference path defined within the waveguide material. The second reference beam traverses a second reference path defined within the waveguide material. The first measurement beam traverses a first measurement path defined within the waveguide material and a first external path defined outside of the waveguide material. The first external path is related to the first location. The second measurement beam traverses a second measurement path defined within the waveguide material and a second external path defined outside of the waveguide material. The second external path is related to the second location. The first measurement path and the first reference path have a first common end. The second measurement path and the second reference path have a second common end.

According to yet another embodiment of the present invention, an apparatus for measuring spatial locations includes a first object at a first location and a waveguide-based interferometer coupled to the first object. The waveguide-based interferometer includes a waveguide material. The waveguide material is adapted to carry at least a first beam and a second beam. The first beam traverses a first path defined within the waveguide material. The second beam traverses a second path defined within the waveguide material and a third path defined outside of the waveguide material. The third path is related to the first location.

Many benefits are achieved by way of the present invention over conventional techniques. For example, certain embodiments of the present invention replaces many of the optical components, their mountings and mechanically variable paths in a conventional interferometer with photolithographically defined components in an inherently stable single mode planar optical waveguide circuit. The waveguide circuit is a planar lightwave circuit (PLC) fabricated in silica on silicon, for example, as described in M. Kawachi, *Silica waveguides on silicon and their application to integrated-optic components,* Optical and Quantum Electronics, Vol. 22, pp391–416 (1990). Other material systems may be used but PLC in silica on silicon usually has mechanical robustness, thermal stability, low coefficient of thermal expansion and commercial fabrication process maturity. Some embodiments of the present invention use a PLC containing at least two circulating optical waveguide circuits. The two circuits are non-interfering until combined at an output coupler. Circuit or waveguide paths on the PLC are photolithographically defined so that thermally induced path-length differences between the two non-interfering circuits are compensated.

Various additional objects, features and advantages of the present invention can be more fully appreciated with reference to the detailed description and accompanying drawings that follow.

BRIEF DESCRIPTION OF THE DRAWINGS

FIG. 9 is simplified diagram illustrating relationship between reflected signal and surface angle;

DETAILED DESCRIPTION OF THE INVENTION

Figure 1:
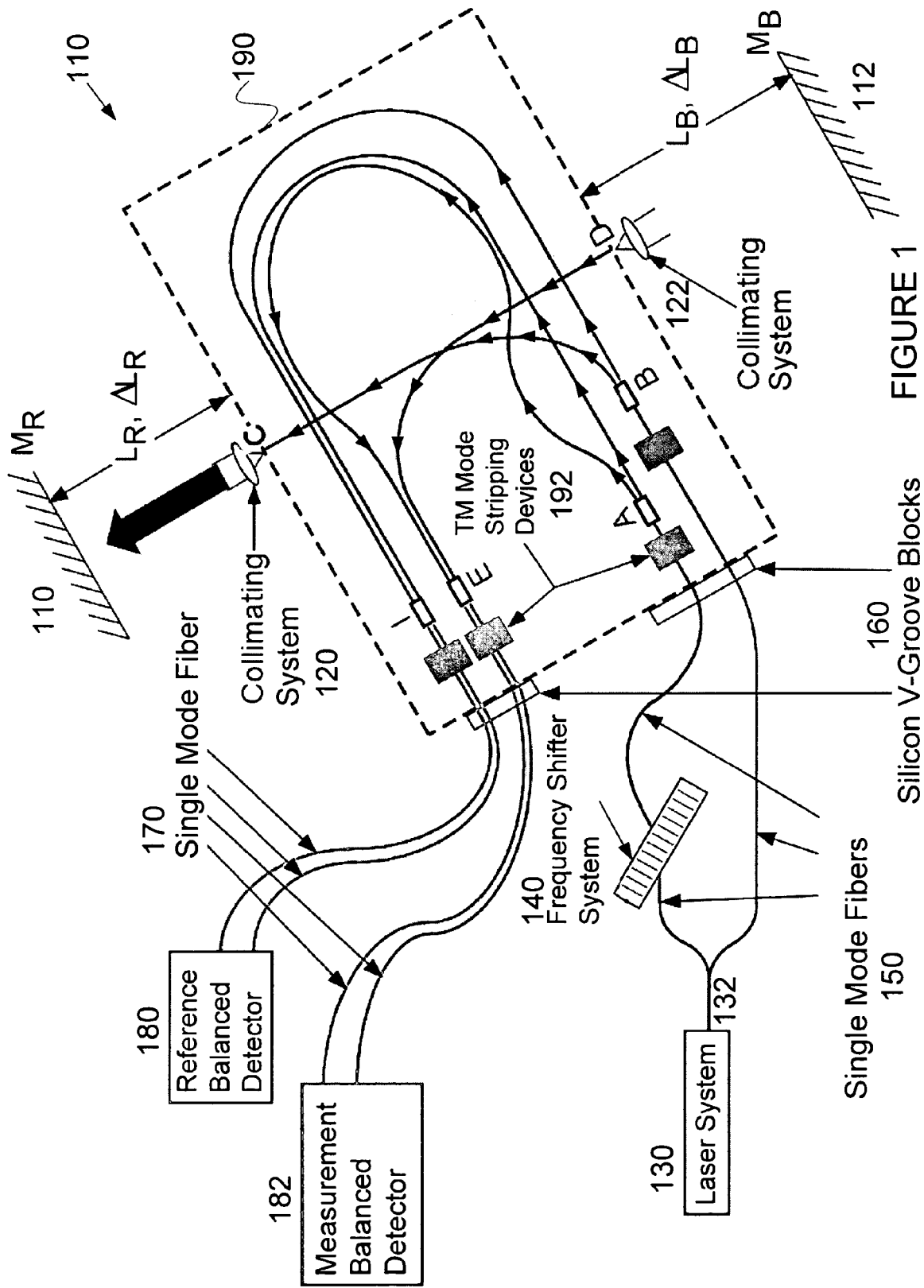
FIG. 1 represents an embodiment of a heterodyne interferometer according to the present invention.

The present invention relates generally to interferometer techniques. More particularly, the invention provides a method and system for using waveguide in an interferometer. Merely by way of example, the invention has been applied to measuring spatial locations, but it would be recognized that the invention has a much broader range of applicability.

Certain embodiments of the present invention use a Planar Lightwave Circuit (PLC). For example, the embodiment shown in FIG. 1 uses a PLC. The circuit is also commonly referred to as a Photonic Integrated Circuit (PIC), a Lightwave Integrated Optic (LIO) circuit or an Integrated Optic (IO) circuit among other common nomenclatures in the literature. PLC fabrication technology has been developed in a number of material systems including glasses, polymers, lithium niobates and III-V semiconductors. Among the glasses are silica ($SiO_2$) glasses with or without additional network forming oxides such as $GeO_2$, $TiO_2$, $P_2O_5$ and/or $B_2O_3$. These glasses and the circuit components therein may be deposited onto various substrates such as silicon (Si) or quartz ($SiO_2$).

Some embodiments of the present invention will be described in terms of the silica on silicon technology due to the mature state of commercial development of this material system along with the desirable mechanical, optical and thermal properties of this material system. However, the present invention can be realized in any of the material systems available for PLC development. The silica on silicon PLC may be fabricated by any of the processes available for this material system including but not limited to flame hydrolysis deposition (FHD), vacuum deposition (VD) and various chemical vapor deposition processes (CVD) including low pressure CVD (LPCVD), atmospheric pressure CVD (APCVD) and plasma enhanced CVD (PECVD).

A PLC according to an embodiment of the present invention can include single mode optical waveguides with one or more of waveguide bends, waveguide crossings, waveguide couplers and waveguide splitters. The waveguide bends usually are constrained to radii of curvature sufficiently large to yield acceptably low radiation loss from the bends. This radiation loss will be determined by the refractive index difference between the waveguide core and cladding materials (the "index contrast") and will be fixed by the particular waveguide properties chosen. Waveguide crossing angles may be determined by a minimum crossing angle that provides an acceptably low level of crosstalk between the two crossing waveguides, which is a function of the index contrast. Minimum bend radii and minimum crossing angles may determine the minimum physical size of the PLC.

Waveguide couplers and/or splitters are identified in the embodiments of FIGS. 1–6 by the letters A, B, E, F, G, H and I. Splitters A and B in FIGS. 1 and 2 along with splitters G and H in FIGS. 5 and 6 may be Y-branch splitters, directional couplers or multimode interference (MMI) devices. All output couplers, E, H and I, may be directional couplers or MMI devices to provide the indicated balanced output. Directional couplers will be described in the various embodiments of the present invention although Y-branch or MMI devices represent examples of applicable alternatives.

FIG. 1 is a simplified diagram for a heterodyne interferometer according to one embodiment of the present invention. This diagram is merely an example, which should not unduly limit the scope of the present invention. One of ordinary skill in the art would recognize many variations, alternatives, and modifications. Heterodyne interferometer 100 includes mirror system 110 also called $M_R$, mirror system 112 also called $M_B$, collimating system 120, collimating system 122, laser system 130, frequency shifter system 140, single mode fibers 150, silicon V-groove blocks 160, single mode fibers 170, reference balanced detector 180, and measurement balanced detector 182, and PLC system 190. Although the above has been shown using systems 110, 112, 120, 122, 130, 140, 150, 160, 170, 180, 182, and 190, there can be many alternatives, modifications, and variations. For example, some of the systems may be expanded and/or combined. For example, mirror system 110 or 112 may be combined with PLC system 190. Other systems may be inserted to those noted above. Depending upon the embodiment, the specific systems may be replaced. Further details of these systems are found throughout the present specification and more particularly below.

Mirror system 110 receives a laser beam from PLC system 190 and sends the laser beam to mirror system 112. Mirror system 112 receives the laser beam and sends the laser beam back to PLC system 190. Between mirror systems 110 and 112, the laser beam travels outside PLC system 190.

Figure 1A:
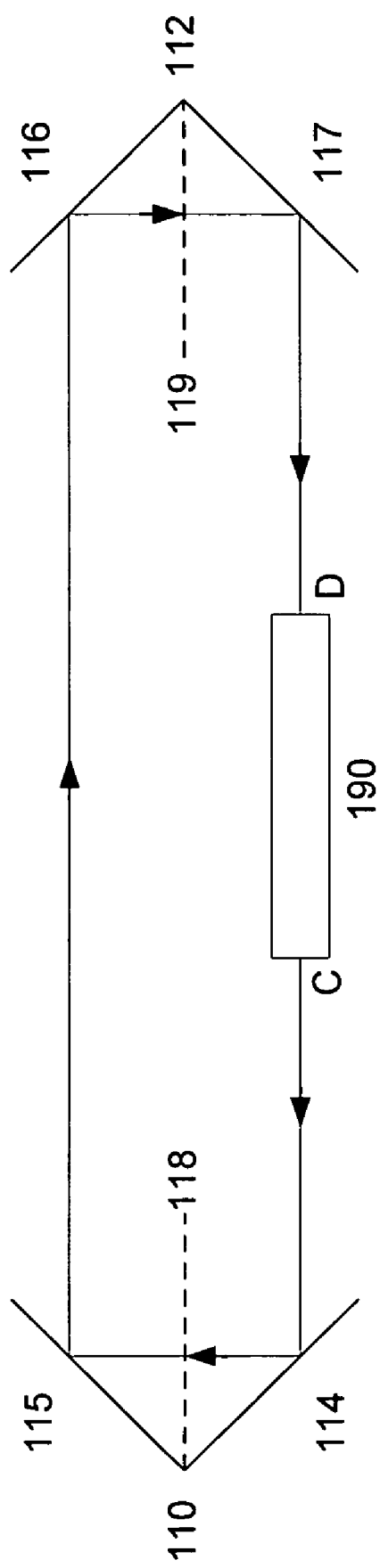
FIG. 1A is a simplified diagram for mirror systems.

FIG. 1A is a simplified diagram for mirror systems 110 and 112. The diagram is merely an example, which should not unduly limit the scope of the present invention. One of ordinary skill in the art would recognize many variations, alternatives, and modifications. Mirror system 110 includes mirrors 114 and 115, and mirror system 112 includes mirrors 116 and 117. Mirror 114 forms a right angle with mirror 115, and mirror 116 forms a right angle with mirror 117. As shown in FIG. 1A, the laser beam leaves PLC system 190 at C and travels towards mirror system 110 substantially in parallel to direction 118. At mirror system 110, the laser beam is reflected off of mirrors 114 and 115 and then travels towards mirror system 112 substantially in parallel to direction 119. At mirror system 112, the laser beam is reflected off mirrors 116 and 117 and subsequently returns to PLC system 190 at D. As discussed above and further emphasized here, FIG. 1A is merely an illustration. For example, mirror systems 110 and 112 may each comprise more or less than two mirrors and the mirrors may take various types of configurations. In one embodiment of the present invention, mirror systems 110 and 112 each comprise a cube corner reflector.

Figure 1B:
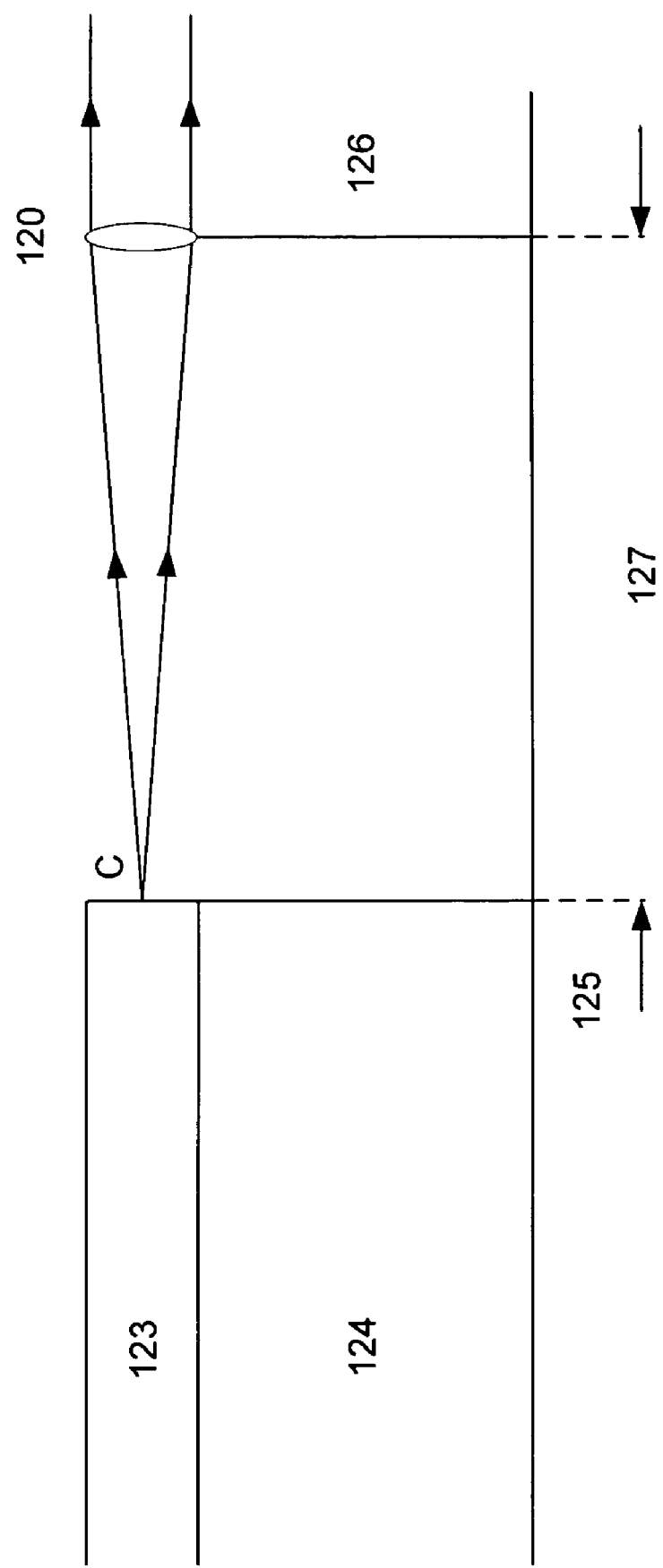
FIG. 1B is a simplified diagram for collimating system.

Collimating system 120 collimates the laser beam exiting from PLC system 190 at C, and collimating system 122 focuses the laser beam returning to PLC system 190 at D. FIG. 1B is a simplified diagram for collimating system 120. The diagram is merely an illustration, which do not unduly limit the scope of the claims. One of ordinary skill in the art would recognize many variations, alternatives, and modifications. As shown in FIG. 1B, PLC system 190 is formed within cladding layer 123 on top of substrate layer 124. Substrate layer 125 and collimating system 120 are attached to support layer 125. Collimating system 120 receives the laser beam exiting out of PLC system 190 at C. Exit C is located at a focal point of collimating system 120 and serves substantially as a point laser source. After the laser beam passes through collimating system 120, the laser beam becomes substantially collimated. Additionally, collimating system 120 is designed so that its thermal expansion in optical length cancels out the thermal expansion of region 127 in support layer 125. This design can be accomplished by various conventional methods, such as CTE technique. Additionally, collimating system 120 may include one lens as illustrated in FIG. 1B or include several lenses. Additionally, collimating system 122 may be constructed with a structure similar to the one shown in FIG. 1B and consistent with the above discussions.

Laser system 130 provide a laser beam that travels through PLC system 190 and is eventually detected by reference detector 180 and measurement detector 182. For example, the laser beam has a wavelength ranging from a near ultraviolet wavelength to a far infrared wavelength. The near ultraviolet wavelength may equal 250 nm, and the far infrared wavelength may equal 50 $\mu$m. To improve accuracy of spatial measurement, laser system 130 should have a good phase stability. Laser beam 132 emitted by laser source 130 usually have a coherent length that exceeds or equals the distance over which the laser beam travels outside PLC system 190 between C, $M_R$, $M_B$, and D. For example, the coherent length is several meters. Laser system 130 may use a He—Ne laser source or other type of laser source.

Frequency shifter system 140 changes the frequency of input laser beam by a predetermined amount. Frequency shifter system 140 may include an acousto-optic frequency shifter, an electro-optic frequency shifter, or other type of frequency shifter. Under certain circumstances, the acousto-optic frequency shifter is preferred. The electro-optic frequency shifter may generate a large number of harmonics and hence contaminate the frequency purity of the laser beam. Additionally, frequency shifter system 140 may include an offset frequency signal generator driving the acousto-optic frequency shifter or the electro-optic frequency shifter.

Single mode fibers 150 transmit the laser beam to PLC system 190 while maintaining polarization of the laser beam. The laser beam emitted from laser system 130 is polarized, and single mode fibers 150 is designed to maintain such polarization. But the purity of the polarization usually degrades with traveling distance in single mode fibers 150. Additionally, the polarization angle with respect to the planar waveguide circuit in PLC system 190 can be difficult to control. Similarly, single mode fibers 170 transmit the laser beam to reference balanced detector 180 and measurement balanced detector 182 while maintaining polarization of the laser beam.

Figure 1C:
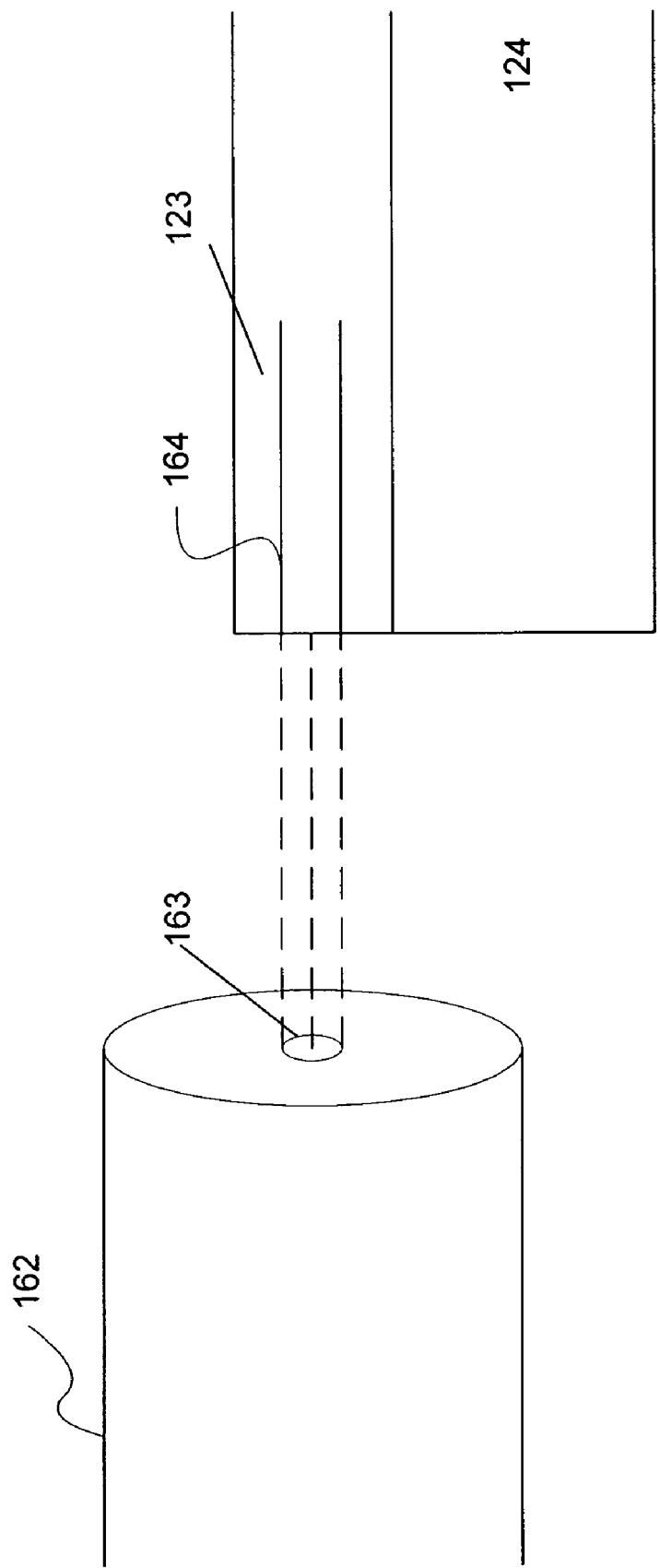
FIG. 1C is a simplified diagram for alignment of single mode fiber and waveguide.

V-groove blocks 160 align center of each of single mode fibers 150 and 170 with their respective entrance to or exit from PLC system 190. FIG. 1C is a simplified diagram for alignment of single mode fiber and waveguide. The diagram is merely an illustration, which do not unduly limit the scope of the claims. One of ordinary skill in the art would recognize many variations, alternatives, and modifications. As shown in FIG. 1C, cladding layer 123 surrounds waveguide core 164. For example, waveguide core 164 is usually about 5-μm in diameter, and cladding layer 123 is usually about 15-μm thick above or below waveguide core 164. Single mode fiber 162 may be one of single mode fibers 150 and 170. Single mode fiber 162 has fiber core 163. For example, single mode fiber 162 is about 125 μm in diameter and fiber core is about 9 μm in diameter. Alignment between fiber core 163 and waveguide core 123 prefers high precision. The high precision may be achieved by using silicon V-groove blocks in some embodiments of the present invention.

Figure 1D:
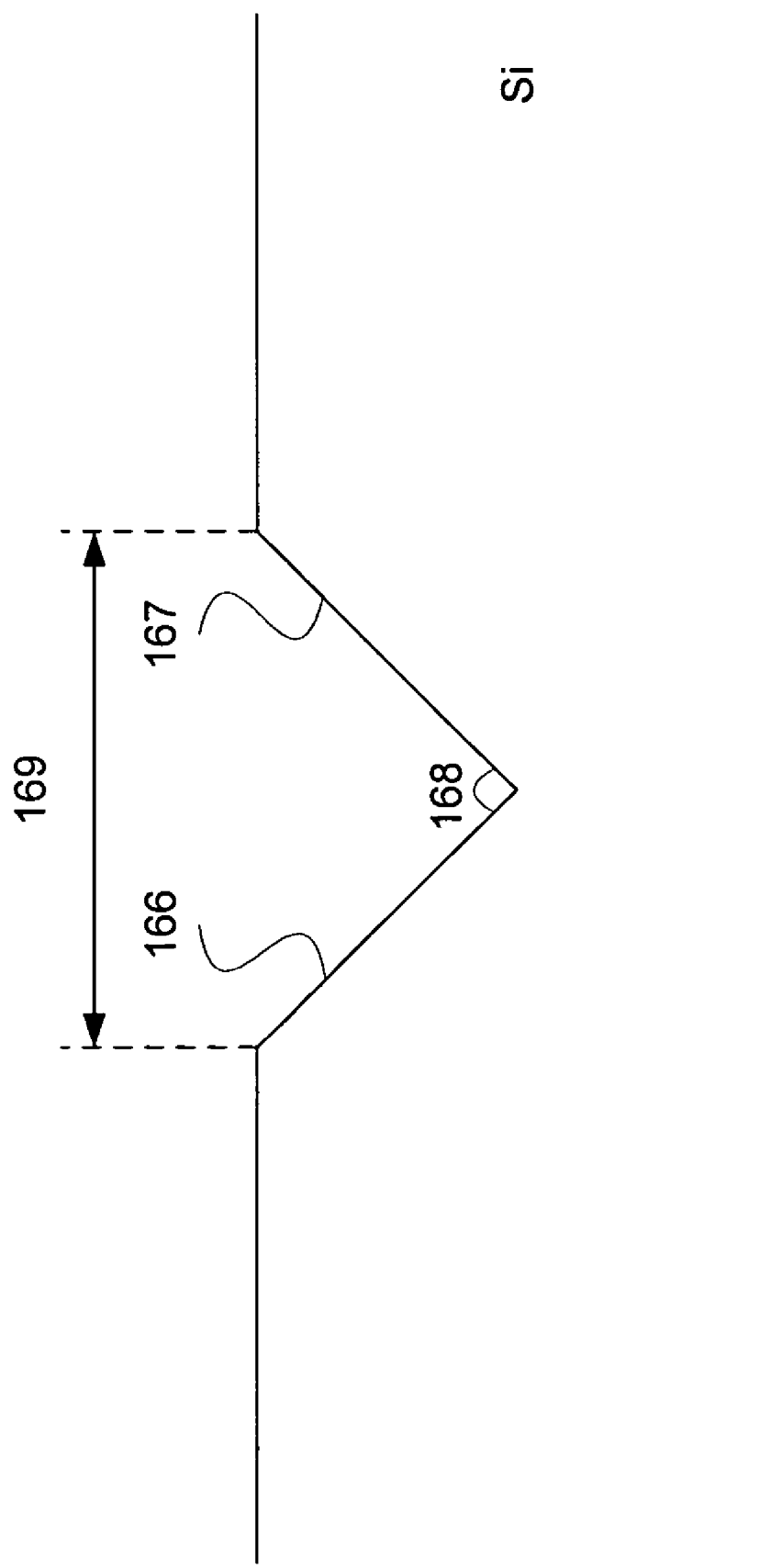
FIG. 1D is a simplified diagram for silicon V-groove blocks according to one embodiment of the present invention.

FIG. 1D is a simplified diagram for silicon V-groove blocks according to one embodiment of the present invention. The diagram is merely an illustration, which should not unduly limit the scope of the claims. One of ordinary skill in the art would recognize many variations, alternatives, and modifications. As shown in FIG. 1D, a silicon V-groove block includes side surfaces 166 and 167. Side surfaces 166 and 167 forms angle 168. Additionally, the silicon V-grove block has opening width 169. For example, side surfaces 166 and 167 are 110 silicon surfaces, and angle 168 equals about 55°.

Figure 1E:
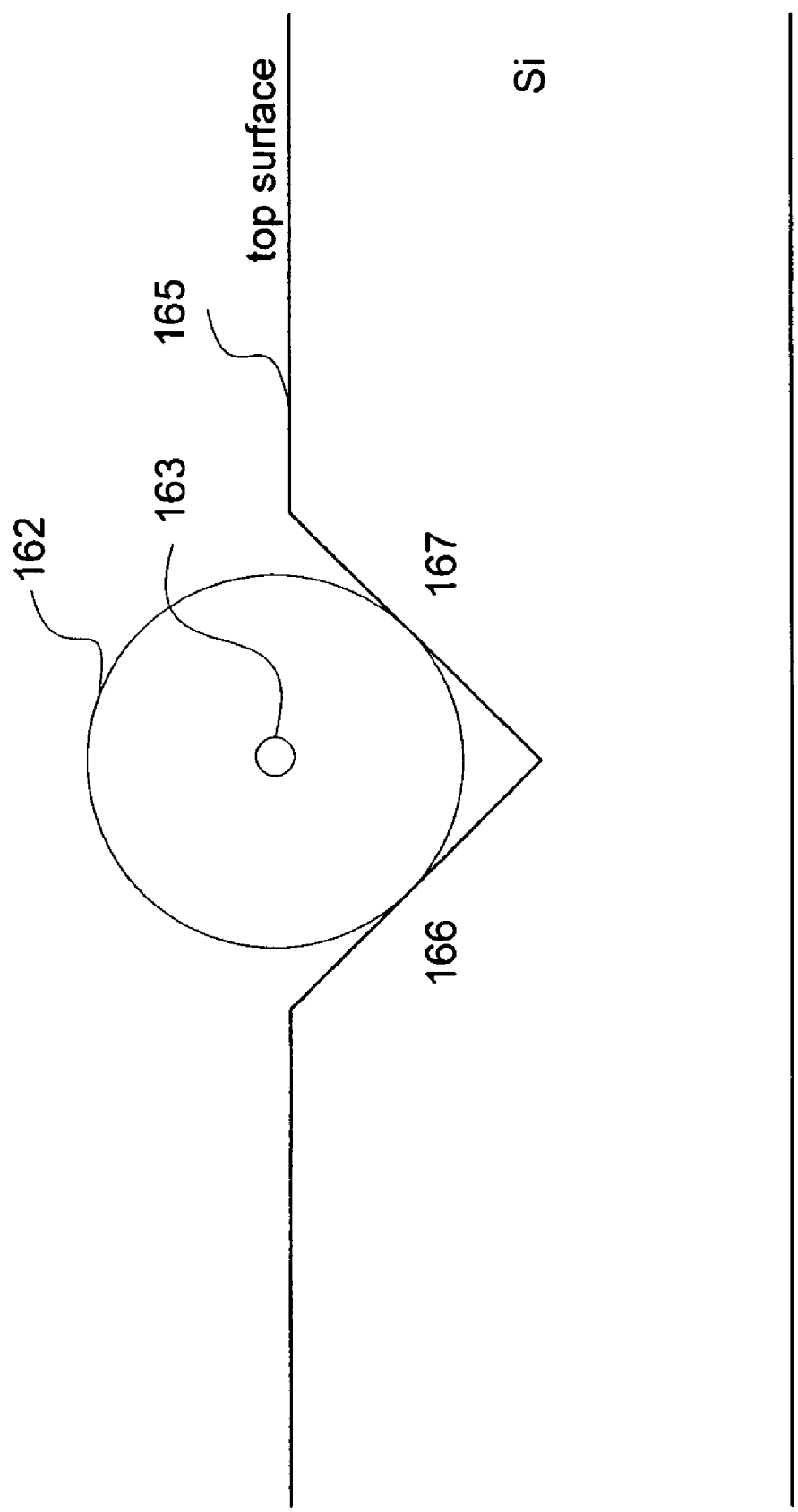
FIG. 1E is a simplified diagram for positioning single mode fiber in silicon V-groove blocks according to one embodiment of the present invention.

FIG. 1E is a simplified diagram for positioning single mode fiber in silicon V-groove blocks according to one embodiment of the present invention. The diagram is merely an illustration, which should not unduly limit the scope of the claims. One of ordinary skill in the art would recognize many variations, alternatives, and modifications. As shown in FIG. 1E, single mode fiber 162 with fiber core 163 are placed in a V-groove block and in contact with side surface 166 and 167. By adjusting opening width 169, the position of single mode fiber 162 and its fiber core 163 may be accurately controlled with respect to top surface 165 of the silicon layer. Hence the alignment between fiber core 163 and waveguide core 123 may be improved.

Reference balanced detector 180 and measurement balanced detector 190 each measure the phase of a heterodyne interference signal by determining the time when the intensity of the signal drops to zero. The phase of each heterodyne interference signal may also be measured by observing other characteristics of the interference signal by other techniques well know in the art.

PLC system 190 is within the rectangular region outlined by the broken line. PLC system 190 includes a planar lightwave circuit and TM mode stripping devices 192. The distance to be measured is the separation between mirrors $M_R$ and $M_B$. The measurement beam may be considered to enter PLC system 190 at coupler B, traverse the path BC on PLC system 190, exit PLC system 190 at C, pass though collimating system 120 and reflect from mirror $M_R$ onto mirror $M_B$. From mirror $M_B$, the beam is reflected back onto the PLC at D after passing though another collimating system 122. The measurement beam then traverses path DE on the PLC and exits the PLC at coupler E.

The path length on PLC system 190 of the measurement beam is BC+DE and the external path length of the measurement beam is $CM_R+M_RM_B+M_BD$. A reference path for the measurement beam is established by the path length BI. The phase of the measurement optical signal entering the PLC at coupler at B is uncontrolled and variable due to phase noise in laser source 130, mechanical and thermal effects in one or more single mode fibers 150 coupling laser source 130 to PLC system 190 at B, and coupling effects between single mode fibers 150 and laser system 130 or PLC system 190. This unknown and uncontrolled optical phase at the input to coupler B may be defined as $\phi_R(t)$.

The heterodyne optical signal may be considered to enter PLC system 190 at coupler A. A portion of the beam exits the PLC through the measurement coupler output at E after traversing the path length AE on the PLC. In this embodiment, the path length AE is selected such that AE=BC+DE so that thermal variations of measurement signal path on chip are equal to thermal variations of heterodyne signal path. A reference path for the heterodyne optical signal may be established by the path length AI such that AI=BI so that thermal variations of these two optical paths are also matched.

The phase of the heterodyne optical signal entering PLC system 190 at coupler at A may be uncontrolled and variable due to phase noise in laser source 130, phase noise in the frequency shifter system 140, mechanical and thermal effects in one or several single mode fibers 150 coupling the laser beam to frequency shifter system 140, one or several single mode fibers coupling frequency shifter system 140 to PLC system 190 at A, and coupling effects between single mode fibers 150 and laser source 130, frequency shifter system 140, or PLC system 190. This unknown and uncontrolled optical phase at the input to coupler A may be defined as $\phi_B(t)$. The embodiment of an interferometer shown FIG. 1 and its corresponding PLC schematic shown in FIG. 2 will be referred to herein as a "Racetrack" configuration since the measurement beam exits PLC system 190 at port C, traverses a loop around PLC system 190 and reenters PLC system 190 through port D. In certain embodiments, this configuration accommodates the required PLC path-length equalities, including AE=BC+DE and AI=BI, by appropriate location of the couplers A and B on the PLC along with an extra "bulge" in the path AE to lengthen the inside track of AE.

Figure 2:
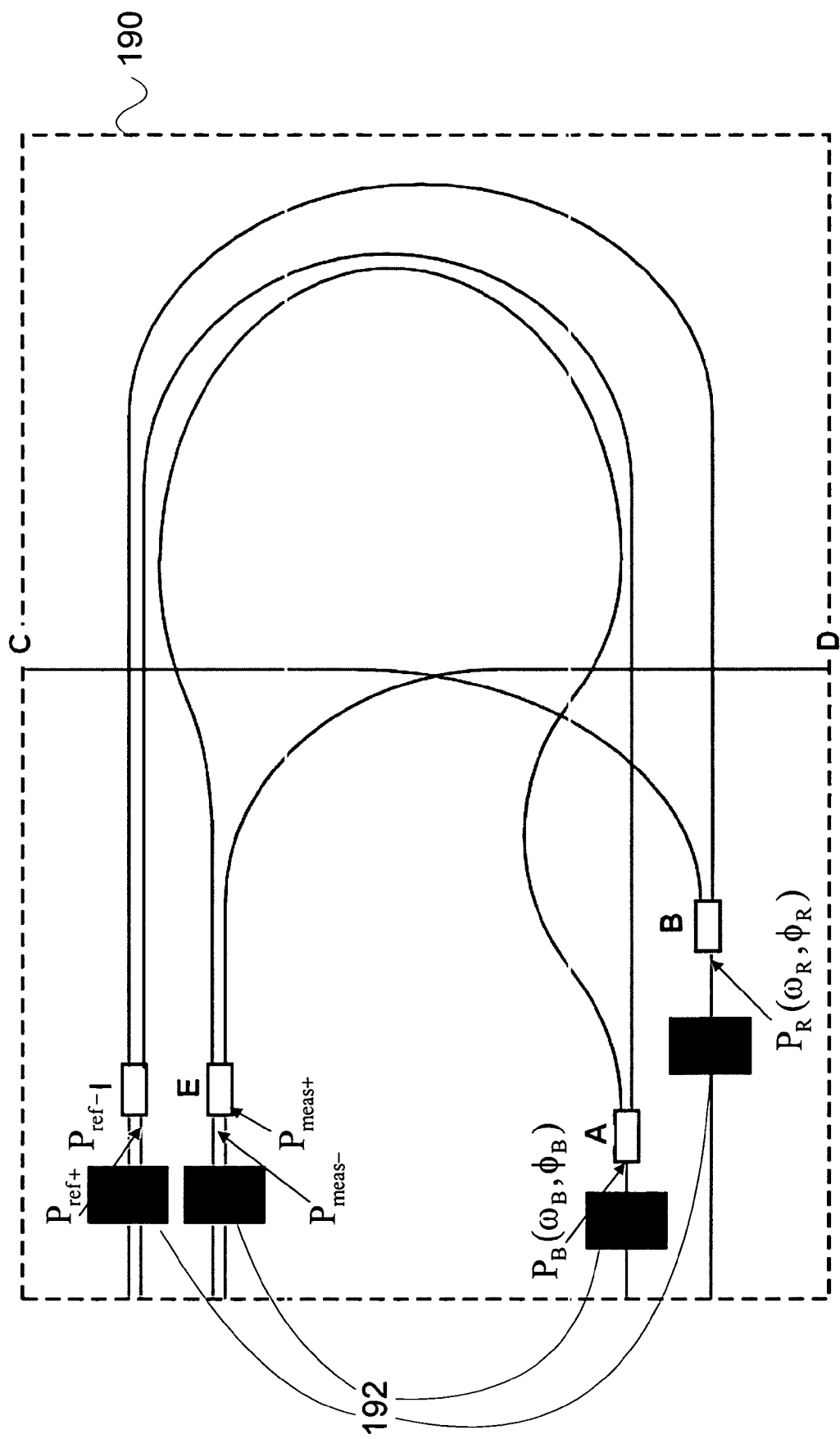
FIG. 2 represents a schematic drawing of an embodiment of a planar lightwave circuit included in the embodiment of a heterodyne interferometer represented in FIG. 1.

In the embodiment of FIGS. 1 and 2, the optical intensity interference pattern at the reference signal output coupler, I, is given by the following Equation 1:

$$P_{ref\mp} = (P_R + P_B \mp 2\sqrt{P_R P_B}\cos[(\omega_R - \omega_B)t + (\phi_R - \phi_B) + (\theta_{BI} - \theta_{AI})])/4 \quad (1)$$

where $P_R$ is the optical power, $\omega_R$ is the optical frequency and $\phi_R(t)$ is the optical phase at the input to coupler B while $P_B$ is the optical power, $\omega_B$ is the optical frequency and $\phi_B(t)$ is the optical phase at the input to coupler A. Equation 1 does not assume that any optical loss will occur. Optical loss would only appear as a reduction in the values of $P_R$ and $P_B$. It would not affect the phase terms that are of interest in the heterodyne interferometer. The upper (minus) sign in the equation corresponds to the optical power in the upper waveguide exiting the coupler I while the lower (plus) sign corresponds to the optical power in the lower waveguide exiting the coupler I.

The phase terms, $\theta_{BI}$ and $\theta_{AI}$ correspond to the optical path lengths $\theta_{BI}=\omega_R n_{eff} BI/c$ and $\theta_{AI}=\omega_B n_{eff} AI/c$ where $n_{eff}$ is the effective refractive index of the guided optical waves and c is the velocity of light in vacuum. The difference of these two phase terms in the output heterodyne interference reference signal may be defined by the following Equation 2:

$$\theta_{BI}-\theta_{AI}=n_{eff}(\omega_R BI-\omega_B AI)/c=\omega_R n_{eff}(BI-AI(1+\Delta\omega/\omega_R))/c \quad (2)$$

where $\Delta\omega$ is the offset frequency difference, $\omega_B-\omega_R$. Since $\omega_R \approx 1.2\times 10^{15}$ radians per second and $\Delta\omega \approx 10^5$ to $10^8$ radians per second, the term involving $\Delta\omega/\omega \approx 10^{-7}$ to $10^{-10}$ may be neglected. As a result, $\theta_{BI}-\theta_{AI} \approx \omega_R n_{eff}(BI-AI)/c \equiv \theta_1$, where $\theta_1$ is a small, temperature insensitive phase angle since $BI \approx AI$ by design. Hence Equation (1) may be simplified as follows:

$$P_{ref\mp}=(P_R+P_B \mp 2\sqrt{P_R P_B}\cos[(\omega_R-\omega_B)t+(\phi_R-\phi_B)])/4 \quad (2A)$$

A similar equation for the optical intensity interference pattern at the measurement output coupler, E, may be given by the following Equation 3:

$$P_{meas\mp}=(P_R+P_B \mp 2\sqrt{P_R P_B}\cos[(\omega_R-\omega_B)t+(\phi_R-\phi_B)+\theta_E+2\phi_L])/4 \quad (3)$$

where $\theta_E \equiv \theta_{BC+DE}-\theta_{AE}$ is a small, temperature insensitive phase angle since $AE \approx BC+DE$ by design and $2\phi_L=\omega_R(CM_R+M_R M_B+M_B D)/c$ contains the external path length of the measurement beam. Hence Equation 3 may be simplified as follows:

$$P_{meas\mp}=(P_R+P_B \mp 2\sqrt{P_R P_B}\cos[(\omega_R-\omega_B)t+(\phi_R-\phi_B)+2\phi_L])/4 \quad (3A)$$

Comparing the phases of the measurement interference pattern, $P_{meas\mp}$, and reference interference pattern, $P_{ref\mp}$, we see that the unknown, uncontrolled phase function, $\phi_R-\phi_B$ may be determined from $P_{ref\mp}$ by reference balanced detector 180. $\phi_R-\phi_B$ is subtracted from the phase of $P_{meas\mp}$ determined by measurement balanced detector 190 and the subtraction results in $2\phi_L$. Consequently, the distance between $M_R$ and $M_B$ is determined as follows:

$$CM_R+M_R M_B+M_B D=2\times c\times \phi_L/\omega_R \quad (3B)$$

Figure 2A:
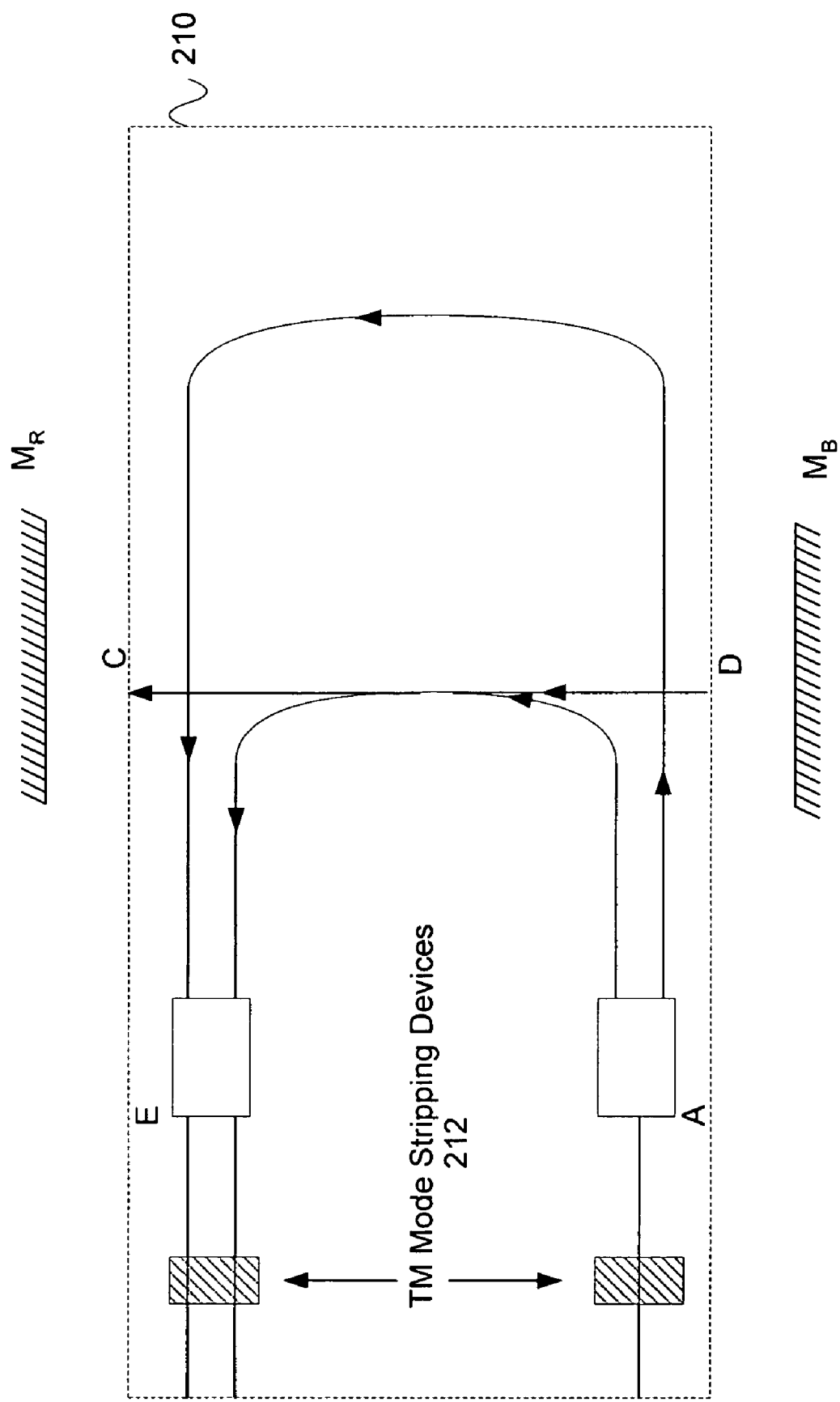
FIG. 2A is a simplified diagram for a homodyne interferometer according to one embodiment of the present invention.

FIG. 2A is a simplified diagram for a homodyne interferometer according to one embodiment of the present invention. The diagram is merely an example, which should not unduly limit the scope of the present invention. One of ordinary skill in the art would recognize many variations, alternatives, and modifications. As shown in FIG. 2A, the homodyne interferometer includes at least PLC system 210 which in turn includes TM Mode Stripping Devices 212 and a planar lightwave circuit. The optical beam from a laser system enters PLC system 210 at coupler A, traverses the path AC on the PLC of PLC system 210, exits the PLC at C, passes though a collimating system and reflect from mirror $M_R$ onto mirror $M_B$. From mirror $M_B$, the beam is reflected back onto the PLC at D after passing though another collimating system. The beam then traverses path DE on the PLC and exits PLC system 210 at coupler E. Additionally, the optical beam enters the PLC at coupler A, traverse the path AE on the PLC, and exits PLC system 210 at coupler E. In this embodiment, the path length AE is selected such that AE=AC+DE so that thermal variations of two signal paths on the PLC are equal to each other. At coupler E, the signals from the two signal paths interfere with each other and form an interference pattern substantially independent of time. This interference pattern can be detected by a conventional detector, and consequently the distance between mirrors, i.e., $CM_R+M_R M_B+M_B D$, can be determined.

Figure 3:
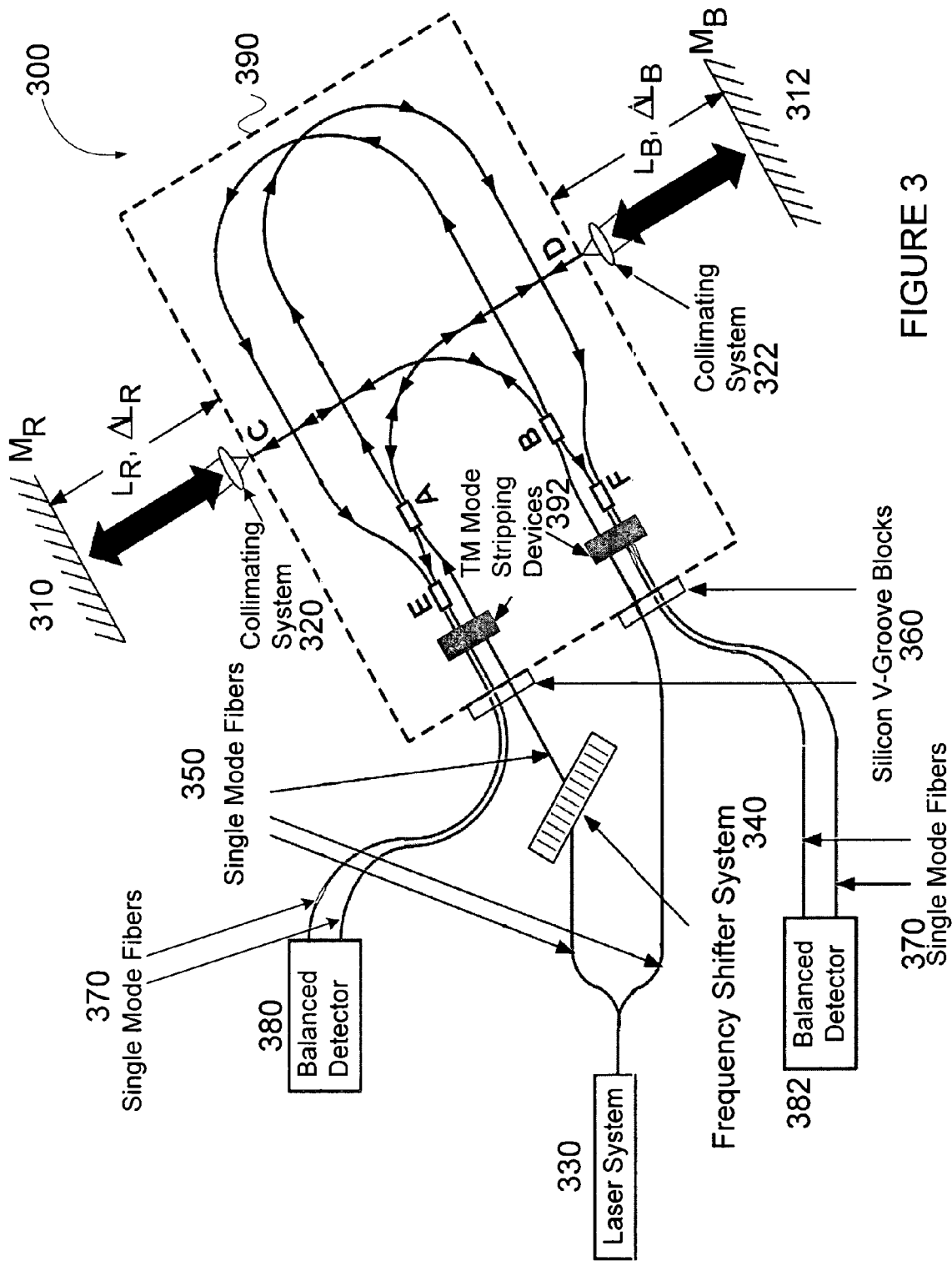
FIG. 3 represents another embodiment of a heterodyne interferometer according to the present invention.

FIG. 3 is a simplified diagram for a heterodyne interferometer according to another embodiment of the present invention. This diagram is merely an example, which should not unduly limit the scope of the present invention. One of ordinary skill in the art would recognize many variations, alternatives, and modifications. Heterodyne interferometer 300 includes mirror system 310 also called $M_R$, mirror system 312 also called $M_B$, collimating system 320, collimating system 322, laser system 330, frequency shifter system 340, single mode fibers 350, silicon V-groove blocks 360, single mode fibers 370, balanced detector 380, and balanced detector 382, and PLC system 390. Although the above has been shown using systems 310, 312, 320, 322, 330, 340, 350, 360, 370, 380, 382, and 390, there can be many alternatives, modifications, and variations. For example, some of the systems may be expanded and/or combined. For example, mirror system 310 or 312 may be combined with PLC system 390. Other systems may be inserted to those noted above. Depending upon the embodiment, the specific systems may be replaced. Further details of these systems are found throughout the present specification and more particularly below.

Collimating system 322, laser system 330, frequency shifter system 340, single mode fibers 350, silicon V-groove blocks 360, single mode fibers 370, balanced detector 380, and balanced detector 382 are substantially similar to collimating system 122, laser system 130, frequency shifter system 140, single mode fibers 150, silicon V-groove blocks 160, single mode fibers 170, balanced detector 180, and balanced detector 182 respectively.

Figure 3A:
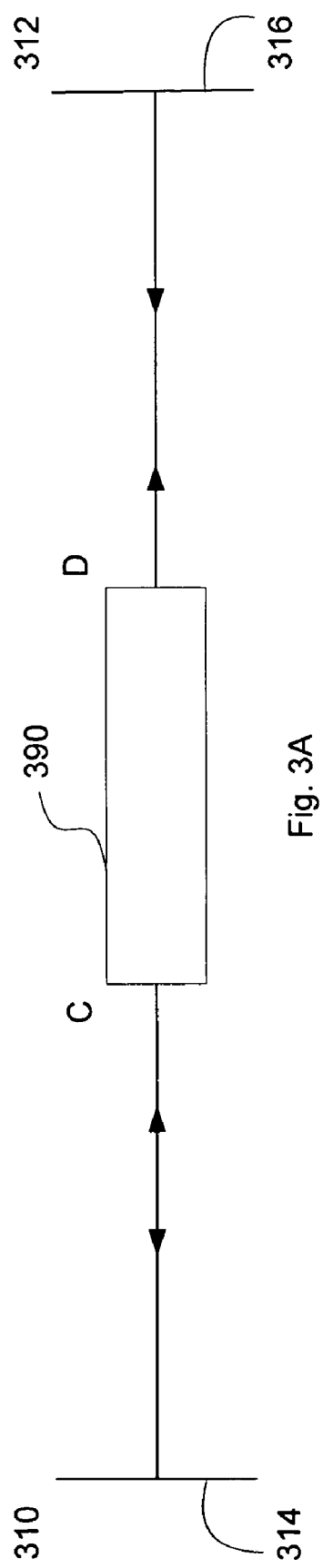
FIG. 3A is a simplified diagram for mirror systems.

FIG. 3A is a simplified diagram for mirror systems 310 and 312. The diagram is merely an example, which should not unduly limit the scope of the present invention. One of ordinary skill in the art would recognize many variations, alternatives, and modifications. Mirror system 310 includes mirror 314, and mirror system 312 includes mirror 316. As shown in FIG. 3A, the laser beam leaves PLC system 390 at C and travels towards mirror system 310 substantially perpendicular to mirror 310. At mirror system 310, the laser beam is reflected off of mirror 314, travels towards PLC system 390, and then reenters PLC system 390 at C. Additionally, the laser beam leaves PLC system 390 at D and travels towards mirror system 312 substantially perpendicular to mirror 316. At mirror system 310, the laser beam is reflected off of mirror 316, travels towards PLC system 390, and then reenters PLC system 390 at D. As discussed above and further emphasized here, FIG. 3A is merely an illustration. For example, mirror systems 310 and 312 may each comprise more than one mirror and the mirrors may take various types of configurations. In one embodiment of the present invention, mirror systems 110 and 112 each comprise a cube corner reflector.

Figure 4:
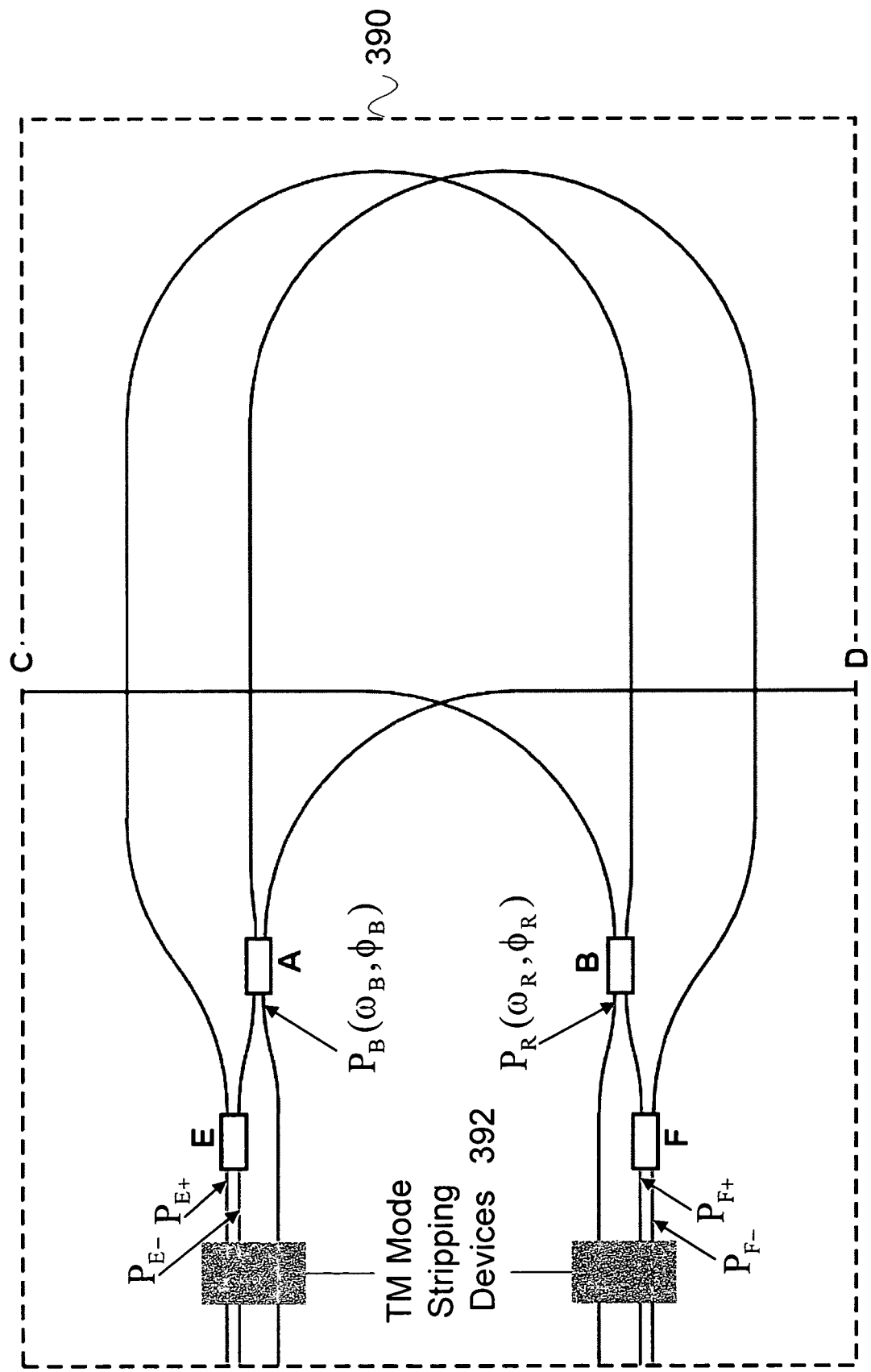
FIG. 4 represents a schematic drawing of an embodiment of a planar lightwave circuit included in the embodiment of a heterodyne interferometer represented in FIG. 3.

PLC system 390 is within the rectangular region outlined by the broken line. PLC system 390 includes a planar lightwave circuit and TM mode stripping devices 392. FIG. 4 schematically represents the embodiment of the PLC circuit incorporated in the interferometer of FIG. 3. The distance to be measured is the sum of the distance from the PLC at C to the mirror at $L_R$ and the distance from the PLC at D to the mirror at $L_B$. One optical source may be considered to enter PLC system 390 at coupler B with optical power, $P_R$, optical frequency, $\omega_R$, and optical phase, $\phi_R(t)$. In this embodiment, the phase of the measurement optical signal entering PLC system 390 at coupler B, $\phi_R(t)$, is uncontrolled and variable due to phase noise in laser source 330, mechanical and thermal effects in one or more single mode fibers 350 coupling laser source 330 to PLC system 390, and coupling effects between one or more single mode fibers 350 and laser source 330 or PLC system. 390. A second optical source may be considered to enter the PLC at coupler A with optical power, $P_B$, optical frequency, $\omega_B$, and optical phase, $\phi_B(t)$. In this embodiment, the phase of the heterodyne optical signal entering PLC system 390 at coupler A, $\phi_B(t)$, is uncontrolled and variable due to phase noise in laser source 330, phase noise in frequency shifter system 340, mechanical and thermal effects in one or more single mode fibers coupling laser source 330 to frequency shifter system 340 and one or more single mode fibers coupling frequency shifter system 340 to PLC system 390, and coupling effects between one or more single mode fibers and laser source 330, frequency shifter system 340 or PLC system 390.

One branch of the path of the measurement optical signal entering PLC system 390 at B traverses the path BC, exits PLC system 390 at C and after an external path of $2L_R$, reenters PLC system 390 at C and traverses the path CBF to the output coupler at F. The path length of this signal on PLC system 390 is 2BC+BF. One branch of the path of the heterodyne optical signal entering PLC system 390 at A traverses the path AF to the output coupler at F. These two path lengths are set equal, i.e. 2BC+BF=AF to compensate thermal effects on PLC system 390.

Another branch of the measurement optical signal entering the PLC at B traverses the path BE to the output coupler at E. Another branch of the heterodyne optical signal entering PLC system 390 at A traverses the path AD, exits the PLC at D and after an external path of $2L_B$, reenters PLC system 390 at D and traverses the path DAE to the output coupler at E. The path length of this signal on PLC system is 2AD+AE. These later two path lengths are also set equal, i.e. 2AD+AE=BE to compensate thermal effects on PLC system 390. The interferometer of FIG. 3 and its corresponding PLC schematic shown in FIG. 4 are referred to herein as the "Trombone." In some embodiments, the PLC path length equalities, 2BC+BF=AF and 2AD+AE=BE are easily accommodated by appropriate adjustment of the lengths of the horizontal straight segments in FIG. 4.

In the embodiment shown in FIGS. 3 and 4, the optical intensity interference pattern at the optical signal output coupler, E, may be defined by the following Equation 4:

$$P_{E\pm} = \frac{P_R}{4} + \frac{P_B}{8} \pm \frac{\sqrt{P_R P_B}}{2^{3/2}} \quad (4)$$
$$\sin[(\omega_R - \omega_B)t + (\phi_R - \phi_B) + (\theta_{BE} - 2\theta_{AD} - \theta_{AE}) - 2\phi_{DL_R}]$$

where $P_R$ is the optical power, $\omega_R$ is the optical frequency and $\phi_R(t)$ is the optical phase at the input to coupler B while $P_B$ is the optical power, $\omega_B$ is the optical frequency and $\phi_B(t)$ is the optical phase at the input to coupler A as indicated in FIG. 4. No optical loss has been assumed in this expression. Optical loss would only appear as a reduction in the values of $P_R$ and $P_B$. It would not affect the phase terms that are of interest in the heterodyne interferometer. The upper (plus) sign in the equation corresponds to the optical power in the upper waveguide exiting the coupler E while the lower (minus) sign corresponds to the optical power in the lower waveguide exiting the coupler E.

The phase terms, $\theta_{BE}$ and $2\theta_{AD}+\theta_{AE}$ correspond to the optical path lengths, $\theta_{BE}=\omega_R n_{\it eff} BE/c$ and $2\theta_{AD}+\theta_{AE}=\omega_B n_{\it eff}(2AD+AE)/c$, where $n_{\it eff}$ is the effective refractive index of the guided optical waves and c is the velocity of light in vacuum. The difference of these two phase terms may be defined by the following Equation:

$$\theta_{BE} - 2\theta_{AD} - \theta_{AE} = n_{\it eff}(\omega_R BE - \omega_B(2AD + AE))/c \quad (5)$$
$$= \omega_R n_{\it eff}(BE - (2AD + AE)(1 + \Delta\omega/\omega_R))/c$$

where $\Delta\omega$ is the offset frequency difference, $\omega_B - \omega_R$. Since $\omega_R \approx 1.2 \times 10^{15}$ radians per second and $\Delta\omega \approx 10^5$ to $10^8$ radians per second, the term involving $\Delta\omega/\omega_R \approx 10^{-7}$ to $10^{-10}$ may be neglected. Also, $\theta_{BE} - 2\theta_{AD} - \theta_{AE} \approx \omega_R n_{\it eff}(BE-(2AD+AE))/c \equiv \theta_E$, where $\theta_E$ is a small, temperature insensitive phase angle since BE≈2AD+AE by design. The phase term $2\phi_{DL_B}=2\omega_B L_B/c$ contains the round trip path length from PLC system 390 at exit point D to mirror system $M_B$ and back to point D.

A similar equation for the optical intensity interference pattern at the optical signal output coupler, F, is given by the following Equation 6:

$$P_{F\pm} = \frac{P_R}{4} + \frac{P_B}{8} \pm \quad (6)$$
$$\frac{\sqrt{P_R P_B}}{2^{3/2}} \sin[(\omega_R \omega_B)t + (\phi_R - \phi_B) + (2\theta_{BC} + \theta_{BF} - \theta_{AF}) + 2\phi_{CL_R}]$$

where $\theta_F \equiv 2\theta_{BC}+\theta_{BF}-\theta_{AF}$ is a small, temperature insensitive phase angle since AF≈2BC+BF by design. The upper (plus) sign in the equation corresponds to the optical power in the upper waveguide exiting the coupler F while the lower (minus) sign corresponds to the optical power in the lower waveguide exiting the coupler F. The phase term $2\phi_{DL_R}=2\omega_R L_R/c$ contains the round trip path length from PLC system 390 at exit point C to mirror $M_R$ and back to point C. If the phase of the signal out of coupler E is subtracted from the phase of the signal out of coupler F, the result $2(\phi_{CL_R}+\phi_{DL_B})+\theta_F-\theta_E$ is obtained, which contains the separation of the two mirrors plus two small, fixed, temperature insensitive terms, $\theta_F$ and $\theta_E$. $\theta_F$ and $\theta_E$ are usually negligible and $\Delta\omega$ is also usually negligible, so the sum of $L_R$ and $L_B$ can be calculated as follows:

$$L_R+L_B=c\times(\phi_{DL_R}+\phi_{DL_B})/\omega_R \quad (6A)$$

Figure 5:
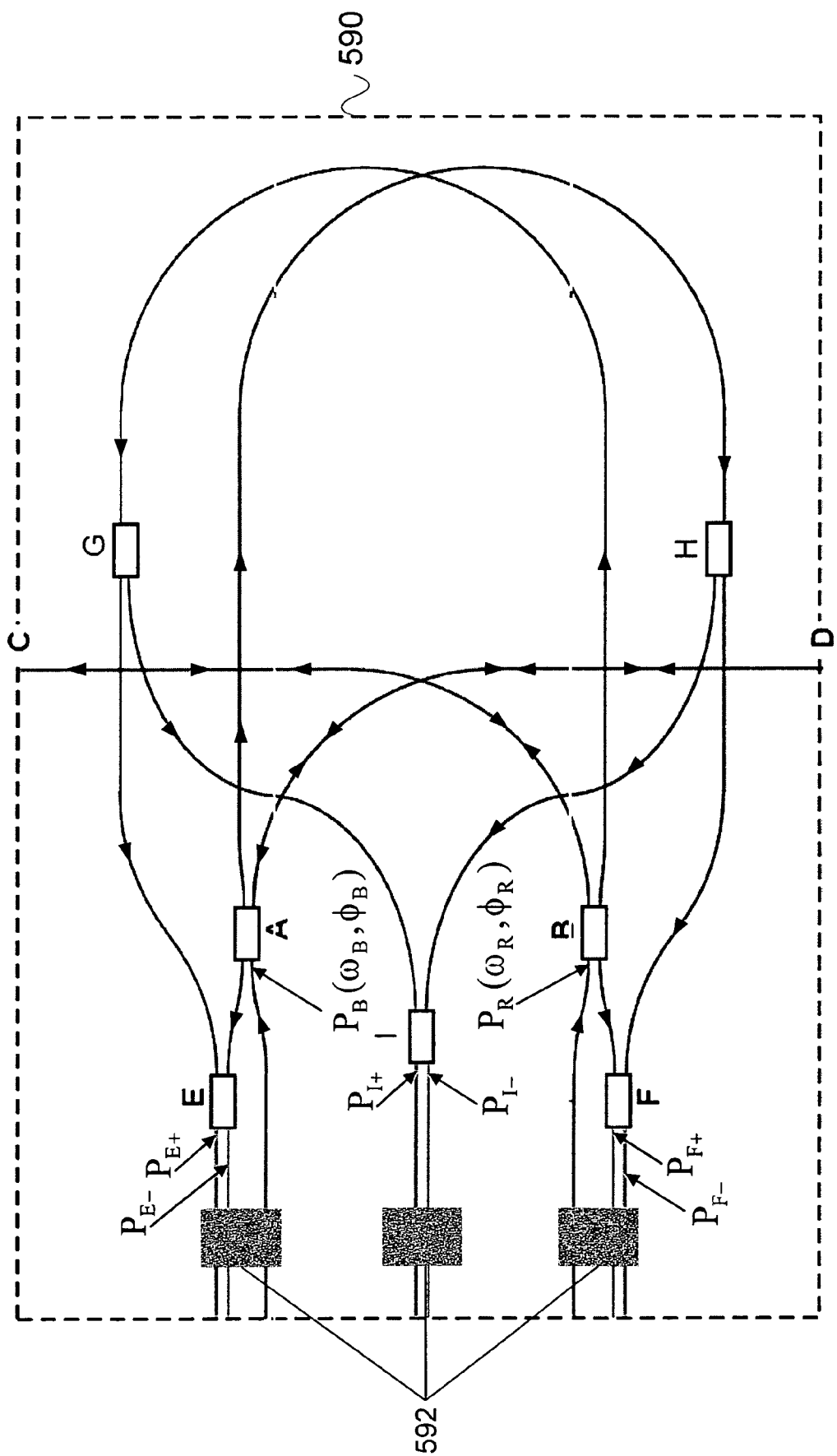
FIG. 5 represents a schematic drawing of another embodiment of a planar lightwave circuit according to the present invention.
Figure 6:
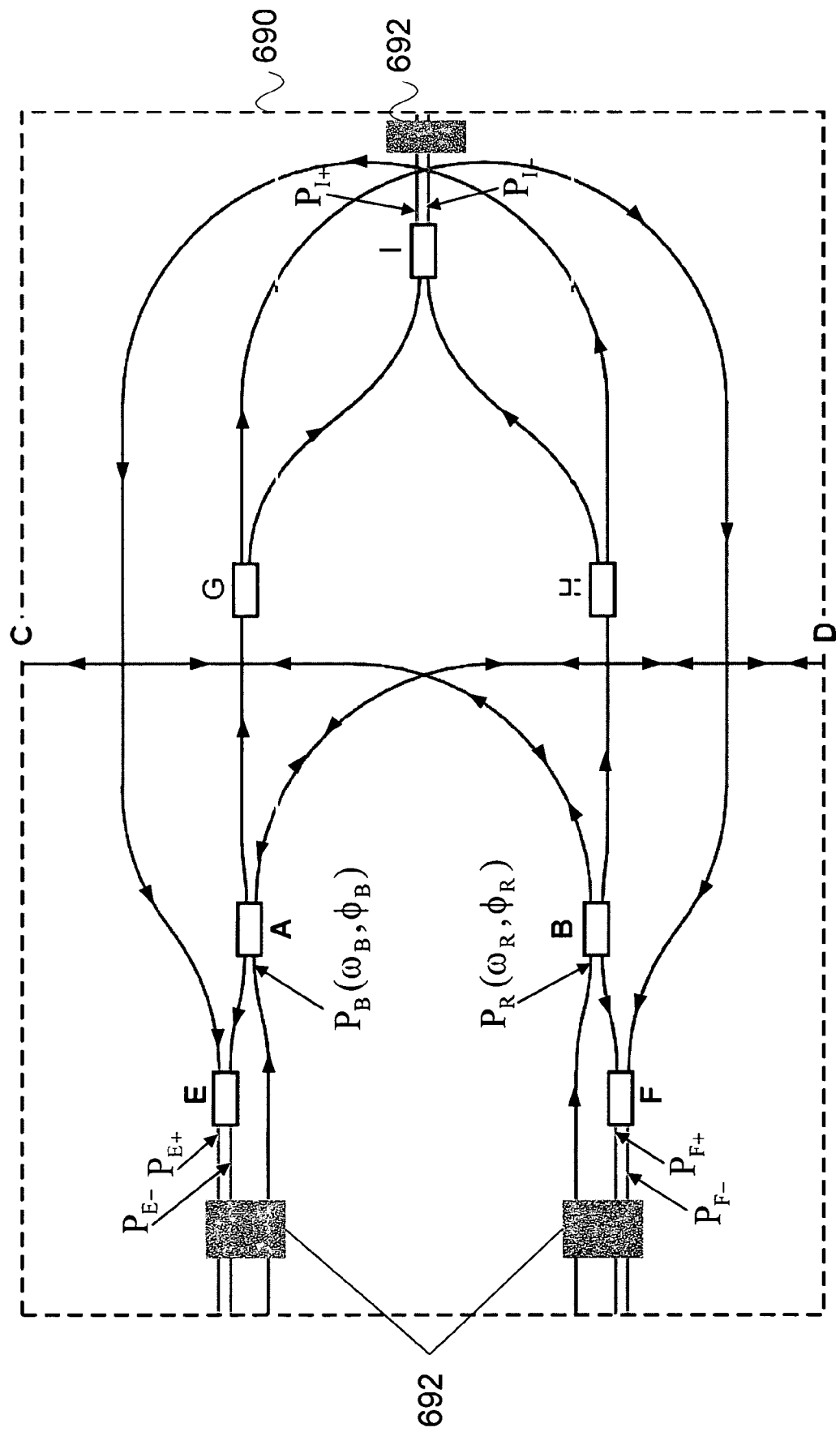
FIG. 6 represents a schematic drawing of yet another embodiment of a planar lightwave circuit according to the present invention.

While the interferometer configuration shown in FIG. 3 is such that measurement of the sum of the two distances, $L_R$ and $L_B$ allows elimination of the uncontrolled phase fluctuations at the input couplers, $\phi_R - \phi_B$, it is also possible to add a separate measurement circuit to determine this quantity as shown the schematic representations of PLC circuits shown in FIGS. 5 and 6.

In FIG. 5, the additional couplers G and H are arranged such that the input phase signal is coupled out on the left side of the PLC. This embodiment is referred to herein as the "Lightbulb". The design and operation of this circuit is essentially the same as the "Trombone" except that some optical power is coupled out at I to provide the reference signal.

As shown in FIG. 5, PLC system 590 is within the rectangular region outlined by the broken line. PLC system 590 includes a planar lightwave circuit and TM mode stripping devices 592. One branch of the measurement optical signal entering PLC system 590 at B traverses the path BC, exits the PLC at C and after an external path of $2L_R$, reenters the PLC at C and traverses the path CBF to the output coupler at F. One branch of the heterodyne optical signal entering PLC system 590 at A traverses the path AD, exits the PLC at D and after an external path of $2L_B$, reenters the PLC at D and traverses the path DAE to the output coupler at E.

Additionally, another branch of the measurement optical signal entering PLC system 590 at B traverses the path BGE to the output coupler at E. Another branch of the heterodyne optical signal entering the PLC at A traverses the path AHF and exits PLC system 590 at F. Moreover, yet another branch of the measurement optical signal entering PLC system 590 at B traverses the path BGI to the output coupler at I. Yet another branch of the heterodyne optical signal entering PLC system 590 at A traverses the path AHI to the output coupler at I.

If the optical signal inputs are as described for the Trombone circuit discussed above, i.e., $P_R$ $(\omega_R,\phi_R)$ into coupler B and $P_B(\omega_B,\phi_B)$ into coupler A, then the optical intensity interference pattern at the optical signal output coupler, E, is given by the following Equation 7:

$$P_{E\pm} = \frac{P_R}{8} + \frac{P_B}{8} \pm \frac{\sqrt{P_R P_B}}{4} \quad (7)$$
$$\sin[(\omega_R - \omega_B)t + (\phi_R - \phi_B) + (\theta_{BG+GE} - 2\theta_{AD} - \theta_{AE}) - 2\phi_{DL_R}]$$

The upper (plus) sign in the equation corresponds to the optical power in the upper waveguide exiting the coupler E while the lower (minus) sign corresponds to the optical power in the lower waveguide exiting the coupler E. The phase angle $\theta_{BG+GE} - 2\theta_{AD} - \theta_{AE} \equiv \theta_E$ is made small and temperature invariant or insensitive by setting the path lengths BG+GE=2AD+AE. $\theta_E$ is usually negligible.

The optical intensity interference pattern at the optical signal output coupler, F, is given by the following Equation 8:

$$P_{F\pm} = \frac{P_R}{8} + \frac{P_B}{8} \pm \frac{\sqrt{P_R P_B}}{4} \quad (8)$$
$$\sin[(\omega_R - \omega_B)t + (\phi_R - \phi_B) + (2\theta_{BC} + \theta_{BF} - \theta_{AH+HF}) + 2\phi_{CL_R}]$$

The upper (plus) sign in the equation corresponds to the optical power in the upper waveguide exiting the coupler F while the lower (minus) sign corresponds to the optical power in the lower waveguide exiting the coupler F. The phase angle $2\theta_{BC} + \theta_{BF} - \theta_{AH+HF} \equiv \theta_F$ is made small and temperature invariant or insensitive by setting the path lengths 2BC+BF=AH+HF. $\theta_F$ is usually negligible. Finally, the optical intensity interference pattern at the optical signal output coupler, I, is given by the following Equation 9:

$$P_{I\pm} = \quad (9)$$
$$\frac{P_R}{8} + \frac{P_B}{8} \pm \frac{\sqrt{P_R P_B}}{4} \sin[(\omega_R - \omega_B)t + (\phi_R - \phi_B) + \theta_{BG+GI} - \theta_{AH+HI}]$$

The upper (plus) sign in the equation corresponds to the optical power in the upper waveguide exiting the coupler I while the lower (minus) sign corresponds to the optical power in the lower waveguide exiting the coupler I. The phase angle $\theta_{BG+GI} - \theta_{AH+HI} \equiv \theta_I$ is made small and temperature invariant or insensitive by setting the path lengths BG+GI=AH+HI. $\theta_I$ is usually negligible. As discussed above, $\omega_B - \omega_R$ is also usually negligible. From the phase of Equation 9, the unknown and uncontrolled phase term, $\phi_R - \phi_B$, may be obtained for an independent determination of $L_R$ and $L_B$ in Equations (7) and (8).

FIG. 6 illustrates an embodiment in which the additional couplers G and H are arranged such that the input phase signal is coupled out on the right side of the PLC. This embodiment is referred to herein as the "Jellyfish". The design and operation of this circuit is similar to the Lightbulb circuit as shown in FIG. 5.

As shown in FIG. 6, PLC system 690 is within the rectangular region outlined by the broken line. PLC system 590 includes a planar lightwave circuit and TM mode stripping devices 692. One branch of the path of the measurement optical signal entering PLC system 690 at B traverses the path BC, exits PLC system 690 at C and after an external path of $2L_R$, reenters PLC system 690 at C and traverses the path CBF to the output coupler at F. The path length of this signal on PLC system is 2BC+BF. One branch of the heterodyne optical signal entering the PLC at A traverses the path AD, exits PLC system 690 at D and after an external path of $2L_B$, reenters PLC system 690 at D and traverses the path DAE to the output coupler at E. The path length of this signal on PLC system 690 is 2AD+AE.

Another branch of the measurement optical signal entering PLC system 690 at B traverses the path BHE to the output coupler at E. Another branch of the heterodyne optical signal entering PLC system 690 at A traverses the path AGF, exits PLC system 690 at F. Additionally, yet another branch of the measurement optical signal entering PLC system 690 at B traverses the path BHI to the output coupler at I. Yet another branch of the heterodyne optical signal entering the PLC at A traverses the path AGI to the output coupler at I.

If the optical signal inputs are as described for the Trombone circuit discussed above, i.e., $P_R(\omega_R,\theta_R)$ into coupler B and $P_B(\omega_B,\theta_B)$ into coupler A, then the optical intensity interference pattern at the optical signal output coupler, E, is given by the following Equation 9A:

$$P_{E\pm} = \frac{P_R}{8} + \frac{P_B}{8} \pm \frac{\sqrt{P_R P_B}}{4} \quad (9A)$$
$$\sin[(\omega_R - \omega_B)t + (\phi_R - \phi_B) + (\theta_{BH+HE} - 2\theta_{AD} - \theta_{AE}) - 2\phi_{DL_R}]$$

The upper (plus) sign in the equation corresponds to the optical power in the upper waveguide exiting the coupler E while the lower (minus) sign corresponds to the optical power in the lower waveguide exiting the coupler E. The phase angle $\theta_{BH+HE} - 2\theta_{AD} - \theta_{AE} \equiv \theta_E$ is made small and temperature invariant or insensitive by setting the pathlengths BH+HE=2AD+AE. $\theta_E$ is usually negligible.

The optical intensity interference pattern at the optical signal output coupler, F, is given by the following Equation 10:

$$P_{F\pm} = \frac{P_R}{8} + \frac{P_B}{8} \pm \frac{\sqrt{P_R P_B}}{4} \quad (10)$$
$$\sin[(\omega_R - \omega_B)t + (\phi_R - \phi_B) + (2\theta_{BC} + \theta_{BF} - \theta_{AG+GF}) + 2\phi_{CL_R}]$$

The upper (plus) sign in the equation corresponds to the optical power in the upper waveguide exiting the coupler F while the lower (minus) sign corresponds to the optical power in the lower waveguide exiting the coupler F. The phase angle $2\theta_{BC}+\theta_{BF}-\theta_{AG+GF} \equiv \theta_F$ is made small and temperature invariant or insensitive by setting the path lengths 2BC+BF=AG+GF. $\theta_F$ is usually negligible.

The optical intensity interference pattern at the optical signal output coupler, I, is given by the following Equation 11:

$$P_{I\pm} = \frac{P_R}{8} + \frac{P_B}{8} \pm \frac{\sqrt{P_R P_B}}{4} \sin[(\omega_R - \omega_B)t + (\phi_R - \phi_B) + \theta_{BH+HI} - \theta_{AG+GI}] \quad (11)$$

The upper (plus) sign in the equation corresponds to the optical power in the upper waveguide exiting the coupler I while the lower (minus) sign corresponds to the optical power in the lower waveguide exiting the coupler I. The phase angle $\theta_{BH+HI}-\theta_{AG+GI} \equiv \theta_I$, is made small and temperature invariant or insensitive by setting the path lengths BH+HI=AG+Gl. $\theta_I$ is usually negligible. As discussed above, $\omega_B-\omega_R$ is also usually negligible. From the phase of Equation 11, the unknown and uncontrolled phase term, $\phi_R-\phi_B$, may be obtained for an independent determination of $L_R$ and $L_B$ in Equations 9A and 10.

Figure 7:
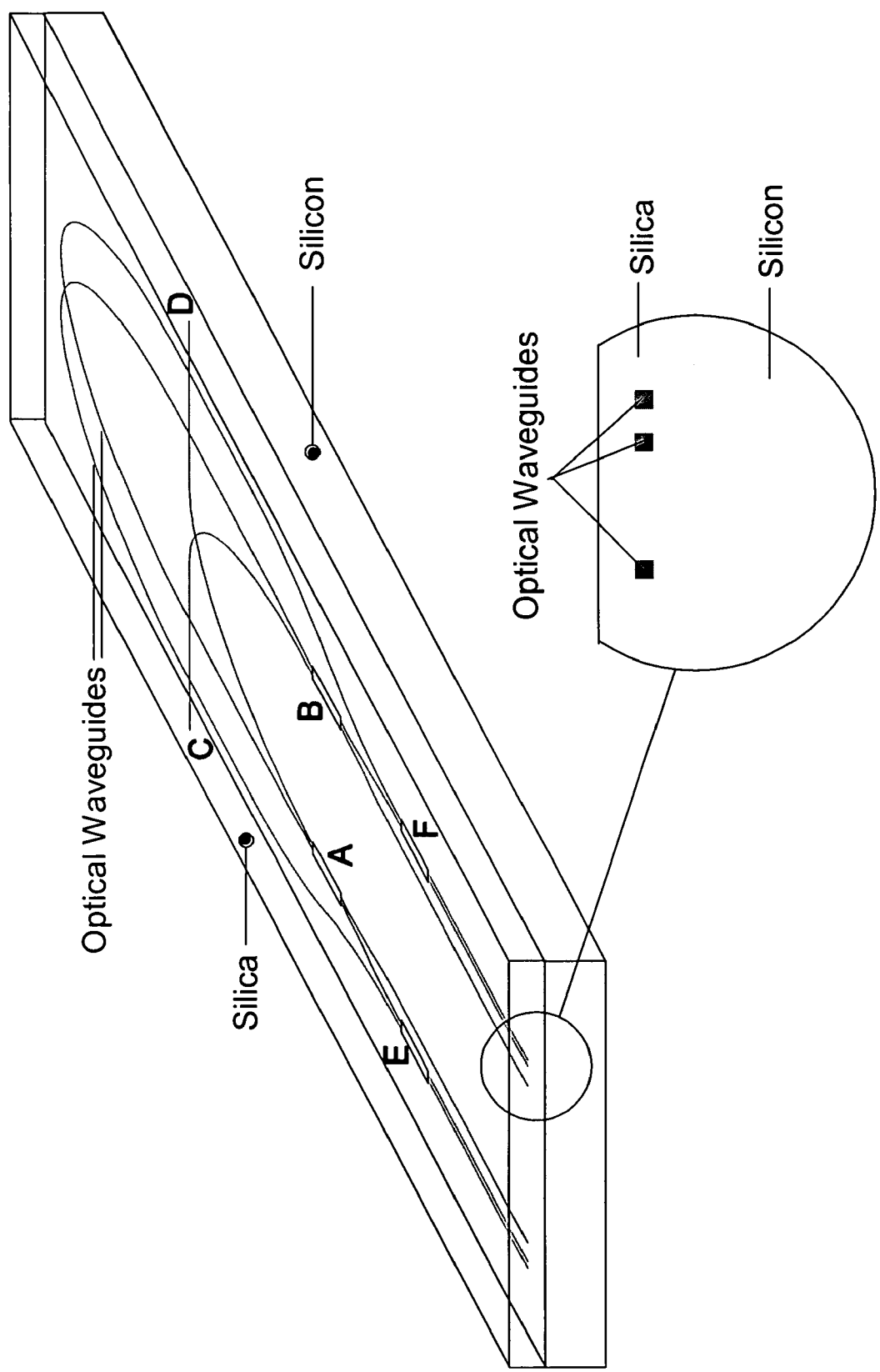
FIG. 7 represents a perspective view and a cross-section of a planar lightwave circuit according to an embodiment of the present invention.

The present invention provide advantages in various applications. For example, certain embodiments of the present invention can provide a number of advantages in the fabrication process. Along these lines, some embodiments of the present invention may be employed to replace a number of discreet, precision optical components and the attendant assembly processes with a single component manufactured with standard industrial processes which have grown out of a combination of optical fiber fabrication technology and microelectronic large scale integration technology. FIG. 7 illustrates a perspective view and a cross-section of a planar lightwave circuit described in conjunction with PLC system 390 in FIGS. 3 and 4. In FIG. 7, optical waveguides are embedded in a silica layer on top of a silicon layer. If the planar lightwave circuit according to some embodiments of the present invention employs telecom industry wavelengths, there is no change or perturbation to standard PLC process lines, even though the photolithographic mask to define the specific circuit is required as a special item.

The optical waveguide size and minimum bending radii may be determined by the specific index contrast utilized in a particular fabrication facility or process. Representative values are given in Table 1 from M. Kawachi, *Recent progress in silica based planar lightwave circuits on silicon*, IEE Proc.-Optoelectron., Vol. 143, pp. 257–262 (1996).

TABLE 1

Silica on Silicon Waveguide Parameters

| Waveguide type | Low Δn | Middle Δn | High Δn |
|---|---|---|---|
| Core/cladding index contrast Δn(%) | 0.25 | 0.45 | 0.75 |
| Core size, μm | 8 × 8 | 7 × 7 | 6 × 6 |
| Loss, dB/cm | <0.1 | <0.1 | <0.1 |
| Fiber coupling loss, dB/point | <0.1 | 0.1 | 0.5 |
| Minimum bending radius, mm | 25 | 15 | 5 |

From the PLC circuits laid out as schematically indicated in FIGS. 2, and 4–6, the minimum bending radii given in Table 1 will establish typical minimum PLC circuit dimensions equal to or greater than about 5 cm by about 5 cm for a low index contrast process to about 1 cm by about 1 cm for a high index contrast process since all circuits involve arcs of about 90° or about 180° in various orientations.

The total thickness of glass on the silicon substrate typically varies from about 10 to about 50 μm. This thickness is dependent on the established processes of various manufacturers and does not affect the operation of the PLC. It may, however, influence the post process fabrication of TM mode stripping structures as discussed below.

In the above analyses, it was assumed that critical phase relations were established at the input couplers (A and B in FIGS. 1, 2, 3, 4, 5, and 6) and persisted only through the output couplers (E, F and I in the FIGS. 1, 2, 3, 5, and 6). This is true since the phase of the two signals exiting coupler A are fixed with respect to one another at the input of coupler A as are the two signals exiting coupler B fixed with respect to one another at the input of coupler B. When the signals exit the couplers E, F or I, the beat note between the two signals leaving the couplers is established and no further interaction occurs. Thus, the entire heterodyne interaction occurs in the robust, monolithic, photolithographically defined structure of silica on silicon.

Figure 8:
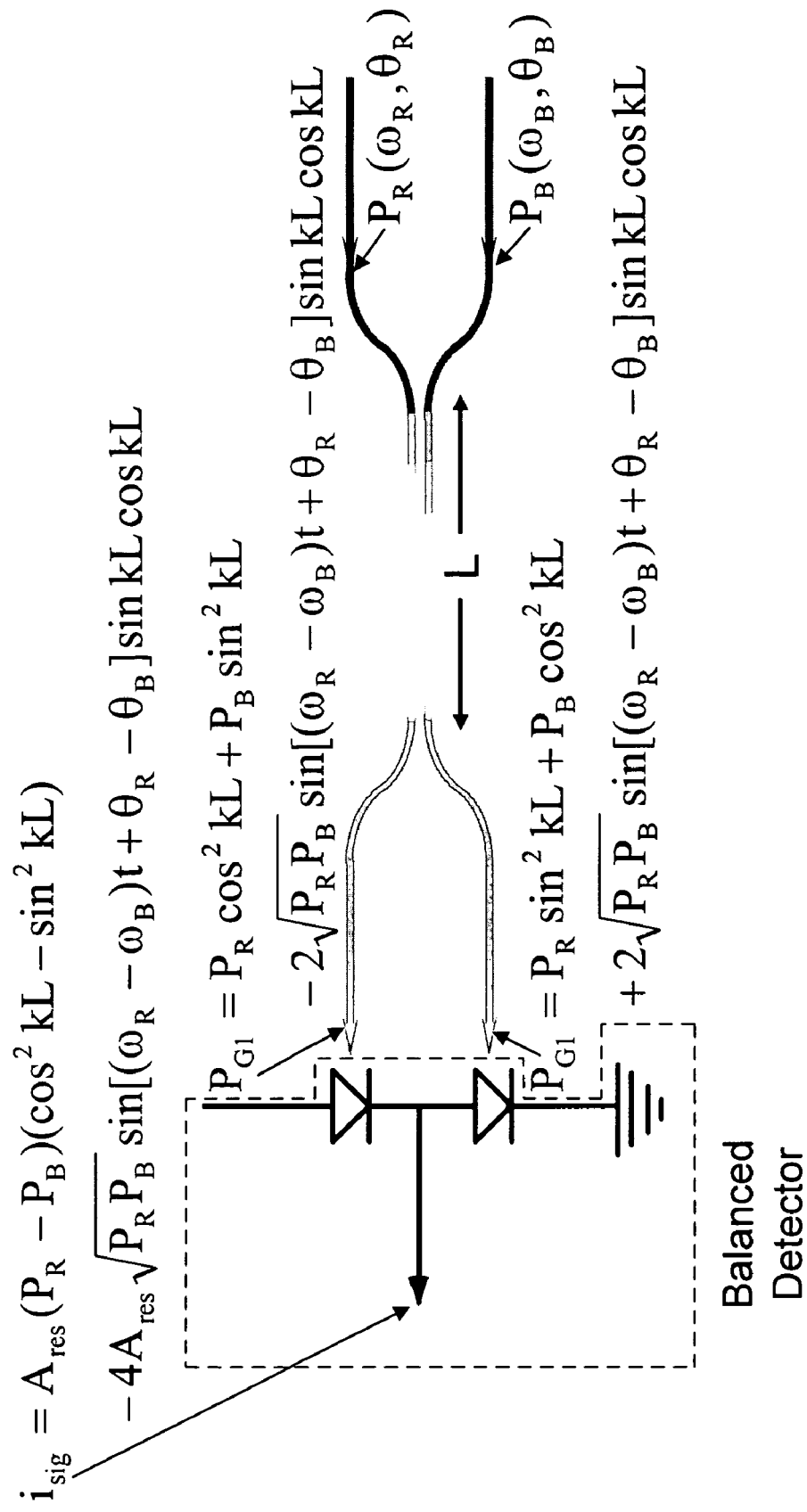
FIG. 8 represents a schematic drawing of an embodiment of a balanced detector.

Some embodiments of the present invention uses couplers, combiners or splitters that equally distribute its output power to two terminals. The equal distribution of output power facilitates balanced detection optimization. However, there may be advantages to use other splitting ratios in certain cases. FIG. 8 schematically represents the output of a balanced detector as being the difference in photocurrents generated in two series connected photodiodes. The input optical powers to a directional coupler are $P_R$ ($\omega_R, \theta_R$) to the upper waveguide and $P_B(\omega_B, \theta_B)$ to the lower waveguide. For example, the directional coupler may be coupler I or E as shown in FIG. 1. The coupling of energy from the lower to upper waveguide and visa versa is dependent upon the coupling constant k between the waveguides and the length L of the interacting region. There is a sinusoidal variation of the coupling with length and coupling constant as indicated in FIG. 8. The upper waveguide existing the PLC has intensity $P_{up}$ as shown below.

$$P_{up} = P_R \cos^2 kL + P_B \sin^2 kL - 2\sqrt{P_R P_B} \sin[(\omega_R-\omega_B)t+\theta_R-\theta_B] \sin kL \cos kL \quad (12)$$

Additionally, the lower waveguide existing the PLC has intensity $P_{down}$ as shown below.

$$P_{down} = P_R \sin^2 kL + P_B \cos^2 kL + 2\sqrt{P_R P_B} \sin[(\omega_R-\omega_B)t+\theta_R-\theta_B] \sin kL \cos kL \quad (13)$$

The balanced detector subtracts the response current corresponding to $P_{down}$ from the response current corresponding to $P_{up}$ and obtain the signal current $i_{sig}$, as shown below.

$$i_{sig} = A_{res}(P_R-P_B)(\cos^2 kL - \sin^2 kL) - 4A_{res}\sqrt{P_R P_B} \sin[(\omega_R-\omega_B)t+\theta_R-\theta_B] \sin kL \cos kL \quad (14)$$

where $A_{res}$ is a constant measuring sensitivity of the detector. If the coupling constant and interaction length are such that $kL=\pi/4$, then the coupling ratio is 50:50 and the signal intensity, $i_{sig}$, in the balanced detector contains only the beat frequency or heterodyne term. Also the signal current $i_{sig}$ reaches the following maximum when $kL=\pi/4$, $$i_{sig} = -2A_{res}\sqrt{P_R P_B} \sin[(\omega_R-\omega_B)t+\theta_R-\theta_B]$$

Furthermore, if the total optical power into the coupler, $P_{opt}=P_R+P_B$ is fixed, then the signal current is maximized for $P_R=P_B=P_{opt}/2$.

If the total input optical power to the PLC is fixed by laser system 130 or 330 as indicated in FIG. 1 or 3 but the optical loss in one channel is excessive (typically in the measurement path to external mirrors $M_R$ and $M_B$), then further circuit optimization may be possible by adjusting the coupling ratios of the input couplers, A and B. In the case of the Racetrack circuit, FIGS. 1 and 2, the input coupler splitting ratio may be designed to provide excess power into the measurement path. In the case of the Lightbulb and Jellyfish circuits shown in FIGS. 5 and 6, the reference splitters G and H may be designed to optimize the division of power between the reference output port at I and the measurement ports at E and F.

Further advantages of certain embodiments of the present invention relate to temperature insensitivity of the devices. In the description of the various embodiments of the PLC circuit, certain path lengths were set equal to minimize thermal effects. These are summarized in Table 2. The small phase offset terms maybe written as $$(\omega_R n_{eff}/c)[\Delta L - L\Delta\omega/\omega_R] \text{ or } (2\pi n_{eff}/\lambda_{oR})[\Delta L - L\Delta\omega/\omega_R]$$

where $\lambda_{oR}$ is the free space wavelength of the optical signal at frequency $\omega_R$.

TABLE 2

| Circuit | Matching Paths | Phase Off-set |
|---|---|---|
| Racetrack FIGS. 1–2 | AE = BC + DE | $\theta_E = \omega_R n_{eff}[BC + DE - AE(1 + \Delta\omega/\omega_R)]/c$ |
|  | AI = BI | $\theta_I = \omega_R n_{eff}[BI - AI(1 + \Delta\omega/\omega_R)]/c$ |
| Trombone FIGS. 3 and 4 | BE = 2AD + AE | $\theta_E = \omega_R n_{eff}[BE - (2AD + AE)(1 + \Delta\omega/\omega_R)]/c$ |
|  | AF = 2BC + BF | $\theta_F = \omega_R n_{eff}[2BC + BF - AF(1 + \Delta\omega/\omega_R)]/c$ |
| Lightbulb FIG. 5 | BG + GE = 2AD + AE | $\theta_E = \omega_R n_{eff}[BG + GE - (2AD + AE)(1 + \Delta\omega/\omega_R)]/c$ |
|  | AH + HF = 2BC + BF | $\theta_F = \omega_R n_{eff}[2BC + BF - (AH + HF)(1 + \Delta\omega/\omega_R)]/c$ |
|  | AH + HI = BG + GI | $\theta_I = \omega_R n_{eff}[BG + GI - (AH + HI)(1 + \Delta\omega/\omega_R)]/c$ |
| Jellyfish FIG. 6 | BH + HE = 2AD + AE | $\theta_E = \omega_R n_{eff}[BH + HE - (2AD + AE)(1 + \Delta\omega/\omega_R)]/c$ |
|  | AG + GF = 2BC + BF | $\theta_F = \omega_R n_{eff}[2BC + BF - (AG + GF)(1 + \Delta\omega/\omega_R)]/c$ |
|  | AG + GI = BH + HI | $\theta_I = \omega_R n_{eff}[BH + HI - (AG + GI)(1 + \Delta\omega/\omega_R)]/c$ |

For example, $\Delta L$ equals BC+DE−AE for Racetrack PLC and may easily be maintained at equal to or less than about 5 micrometers by the photolithographic design/fabrication process, including the location of the PLC edges at C and D in FIGS. 1–6. The edges of the PLC may be identified by a series of fiducial lines included on the photolithographic mask and precision edge polishing following PLC fabrication. The properties of silica on silicon PLCs is such that the thermal coefficient of optical path length changes in a silica based waveguide is $$\frac{1}{\Delta L}\frac{d}{dT}(n_{eff}\Delta L) = 1 \times 10^{-5} \; [1/^\circ \text{C.}]$$

so that if $\Delta L \leq$ about 5 μm, $\delta\Delta L \leq$ about $5 \times 10^{-5} \delta T$ μm. A change in temperature of approximately one degree Celsius will result in only about 50 picometers of PLC unbalance change.

From the embodiments of interferometer PLCs indicated in FIGS. 2, 2A, 4, 5 and 6, the PLC optical path lengths of all paths from A or B to E, F, or I will be $L \sim 2\pi R_{min}$, where $R_{min}$ is the minimum radius of curvature from Table 1. Since $5 \leq R_{min} \leq 25$ mm and $10^{-10} \leq \Delta\omega/\omega_R \leq 10^{-7}$, the maximum thermal contribution of the $n_{eff} L\Delta\omega/\omega_R$ term to the optical path-length change will be $\delta L \leq 1.6 \times 10^{-8} \delta T$ micrometers. A temperature change of about one degree Celsius will result in only about 0.016 picometers of PLC unbalance change, which is completely negligible compared to the thermal effects associated with $\Delta L$ changes.

Still additionally advantages of some embodiments of the present invention relate to immunity of devices from spurious signals. Spurious signals at the output couplers at the two frequencies $\omega_R$ and $\omega_B$, which have traversed paths other than the intended path will introduce measurement errors. These spurious signals may arise from reflections (especially at PLC interfaces with the external world), cross coupling (at waveguide crossings) and polarization mode dispersion.

The use of "angle lapping" is well known in the fiber optic industry to reduce reflections at fiber-fiber interfaces. This technique is also used for fiber PLC interfaces. An additional interface refection reduction at fiber PLC interfaces is accomplished by the use of index matching bonding agents at the silicon V-block fiber assembly structures indicated in FIGS. 1 and 3. For the interferometer, reflection reduction at the PLC free space interfaces, ports C and D in the embodiments shown in FIGS. 1–7, by angle lapping will result in reflection reduction as indicated in FIG. 9. The angle may vary from zero degree to about 7.5 degrees. Further reduction may be achieved by anti reflection coating of the PLC free space interface.

Single mode optical fibers and single mode waveguides in PLCs may sustain two orthogonal polarizations that may propagate at slightly different velocities. It may therefore be necessary to preferentially excite only one polarization mode at each input port, such as ports A and B in the embodiments shown in FIGS. 1–7, and to remove any optical power scattered from the desired mode into the orthogonal mode in the interferometer. This "mode stripping" operation may be accomplished at the output ports, such as ports E, F and I in the embodiments shown in FIGS. 1–7, as well as at portions of PLCs close to output interface C or/and D.

Figure 10:
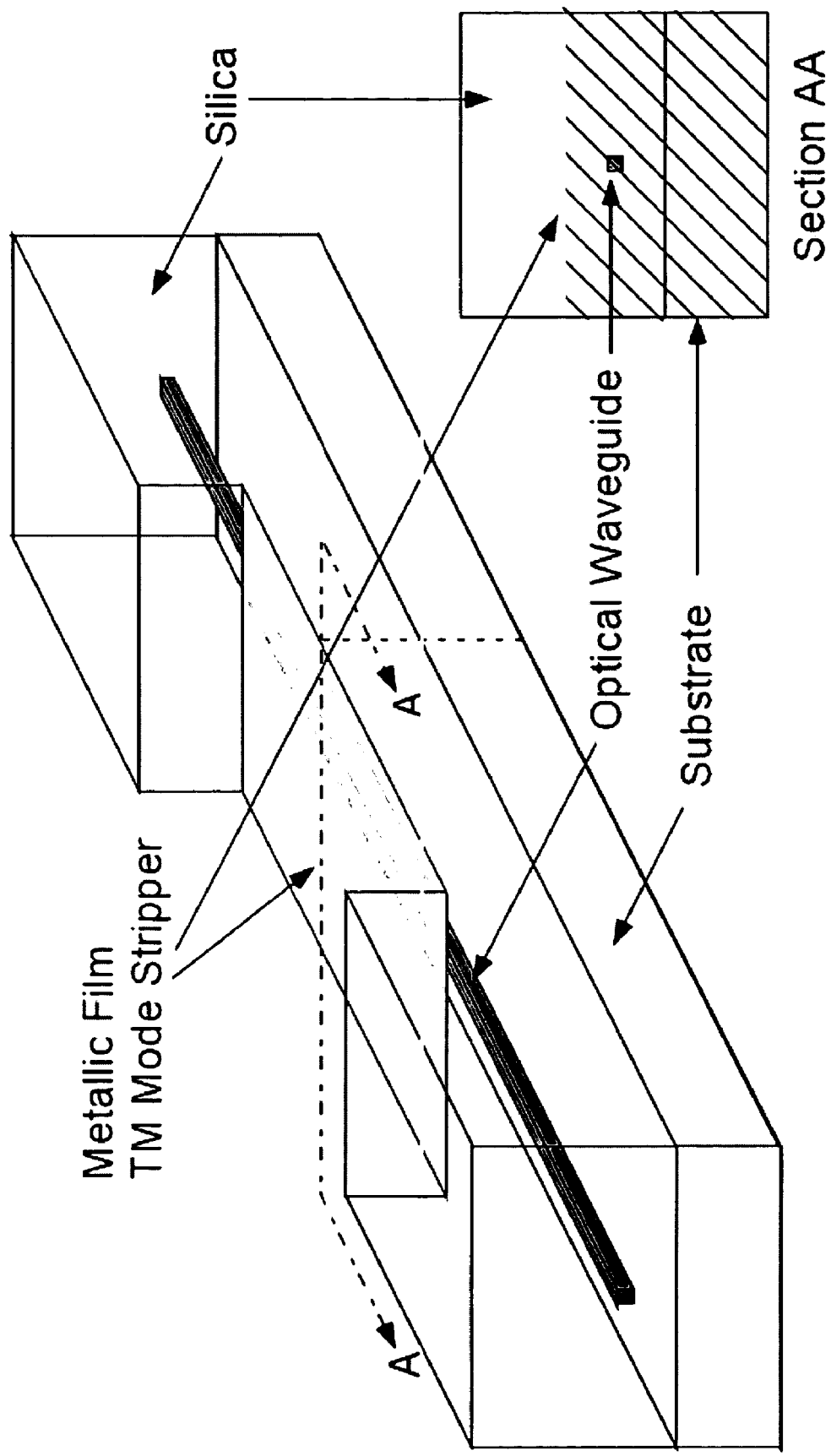
FIG. 10 represents a TM mode stripper according to an embodiment of the present invention.
Figure 11:
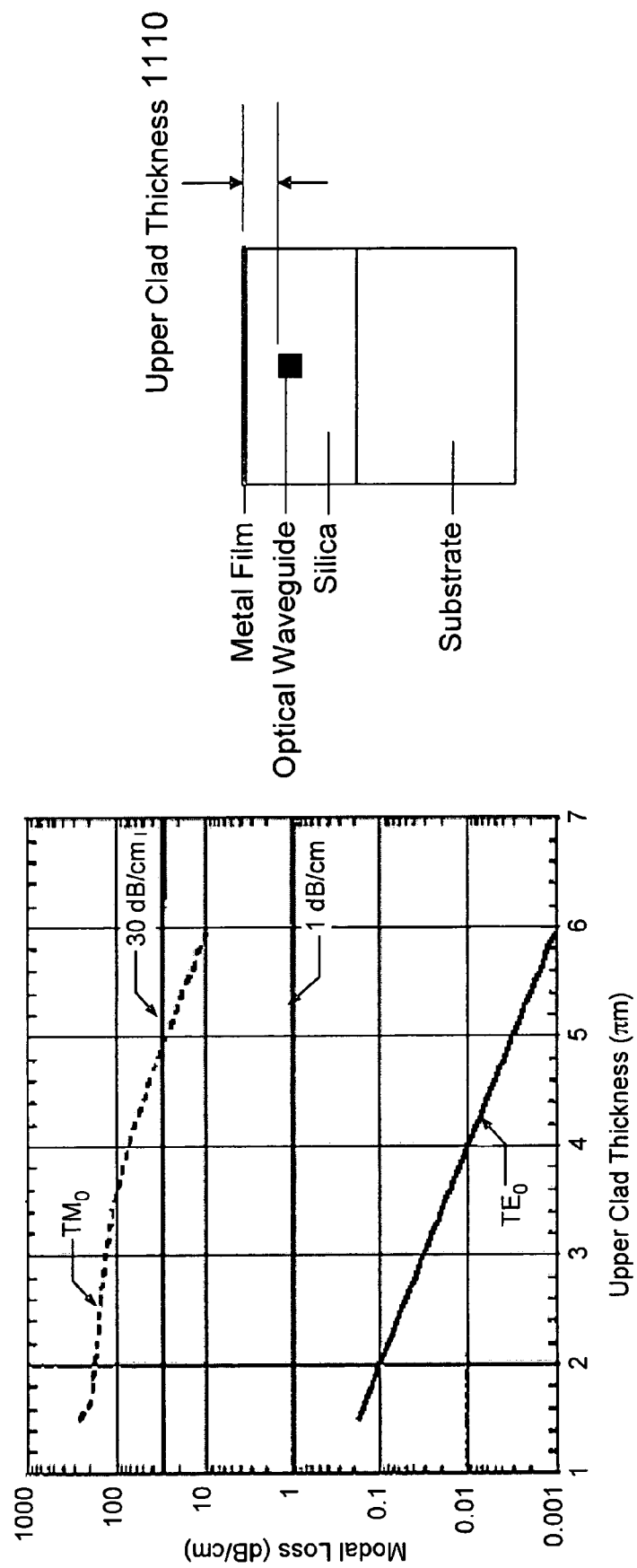
FIG. 11 is a simplified diagram illustrating the effectiveness of the TM mode stripper as shown in FIG. 10.

Preferential excitation of the desired mode may be accomplished by transporting the polarized laser beam to the PLC by polarization maintaining fibers as indicated for example in FIGS. 1 and 3. A mode stripping structure may be fabricated in PLCs as indicated in FIGS. 10 and 11. This structure can operate on the differing optical currents associated with the TE and TM modes that are induced in a metallic conductor. The TM optical mode is characterized by a large transverse optical frequency magnetic field oriented parallel to the plane of the PLC while the TE optical mode is characterized by a large optical frequency magnetic filed oriented perpendicular to the plane of the PLC. The tangential magnetic field induces optical currents in adjacent metallic conductors. FIG. 11 illustrates optical attenuation in the TM and TE modes of a high-index-contrast single mode waveguide due to an Al metal film. The index contrast is represented by $\Delta n$. The thick top waveguide cladding layer may be thinned to the desired depth by various processes such as reactive ion etching, ion beam milling and/or wet chemical etching. As shown in FIG. 11, upper clad thickness 1110 may range from 2 to 4 μm. The chosen etch procedure may be adjusted to provide a smooth surface for the deposition of the metallic film. The chosen example metal, Al, was selected due to the large magnitude of both the real, n, and imaginary, k, components of the optical index for Al at a wavelength of about 1.56 μm. These mode stripping patches may be located outside of the PLC paths before the input couplers A and B, after the output couplers E, F, and I in FIGS. 1–7, or close to PLC interface C or D.

Certain embodiments of the present invention provide a solution to problems existing with known devices. Along these lines, these embodiments provide a small, lightweight and robust optical gauge. A planar lightwave circuit (PLC) according to the present invention replaces large bulk components typically utilized in known devices. Use of the PLC according to some embodiments of the present invention results in smaller devices that are less sensitive or insensitive to thermal changes. The top surface of a PLC system may be less than 25 cm², as shown by PLC system 190 in FIGS. 1 and 2, by PLC system 210 in FIG. 2A, by PLC system 390 in FIGS. 3 and 4, and 7, by PLC system 590 in FIG. 5, and by PLC system 690 in FIG. 6. The PLC system may weigh less than 20 grams. Additionally, a device according to certain embodiments of the present invention can be fiber coupled to inputs and outputs, such as sensors and light sources, and contains few components. Features of some embodiments of the present invention can permit devices to measure distance changes, for example, that are on the order of about one millionth of the wavelength of light utilized in an application of the device.

Some embodiments of the present invention can provide a device that can be utilized in the control of large structures by providing position, velocity, and acceleration data for control loops, characterization of turbulent flow by measuring velocity spectra, characterization of sound by measurement of motion of surfaces, among other variables. Due to its size, construction, and operating characteristic, certain embodiments of the present invention are particularly suited to use for control of large, remotely controlled optical systems. Devices according to the present invention could also be utilized on assembly lines, where process controls require the non-contact control of positions and velocity. Devices according to the present invention are particularly useful where a rugged design is required.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. For example, the PLC circuits in FIGS. 4, 5, and 6 may be modified to form homodyne interferometers. As another example, the waveguide circuits used in various embodiments of the present invention are not planar. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. An apparatus for measuring spatial locations, the apparatus comprising:
    a first object at a first location;
    a second object at a second location;
    a waveguide-based interferometer coupled between the first object and the second object;
    wherein
       the waveguide-based interferometer comprising a waveguide material, the waveguide material being adapted to carry at least a reference beam and a measurement beam;
       the reference beam traverses a first path defined within the waveguide material;
       the measurement beam traverses a second path defined within the waveguide material and a third path defined outside of the waveguide material, the third path related to at least one of the first location and the second location.

2. The apparatus of claim 1 further comprising a polarization stripping device located on the waveguide material for eliminating a polarization in the measurement beam or the reference beam.

3. The apparatus of claim 2 wherein the polarization stripping device is a TM mode stripping device for eliminating a TM mode in the measurement beam or the reference beam.

4. The apparatus of claim 1 wherein the first path and the second path equal to each other within an accuracy of 5 μm or less.

5. The apparatus of claim 4 wherein the accuracy changes in an amount equal to or less than 50 picometers for a temperature change of 1° c.

6. The apparatus of claim 1 wherein the waveguide material comprises silica.

7. The apparatus of claim 6 wherein the waveguide material is placed on a silicon layer.

8. An apparatus for measuring spatial locations, the apparatus comprising:
    a first object at a first location;
    a second object at a second location;
    a waveguide-based interferometer coupled between the first object and the second object;
    wherein
       the waveguide-based interferometer comprising a waveguide material, the waveguide material being adapted to carry at least a reference beam at a reference frequency and a corresponding reference wavelength and a measurement beam at a measurement frequency and a corresponding measurement wavelength;
       the reference frequency is different from the measurement frequency;
       the reference beam traverses a first path defined within the waveguide material;
       the measurement beam traverses a second path defined within the waveguide material and a third path defined outside of the waveguide material, the third path related to at least one of the first location and the second location.

9. The apparatus of claim 8 wherein the first location or the second location is determined within a measurement accuracy of two millionths of the measurement wavelength.

10. The apparatus of claim 9 wherein the first location or the second location is determined within a measurement accuracy equal to or smaller than one millionth of the measurement wavelength.

11. The apparatus of claim 9 wherein the measurement wavelength ranges from a near ultraviolet wavelength to a far infrared wavelength.

12. The apparatus of claim 10 wherein the waveguide-based interferometer further comprises a top surface less than 25 cm².

13. The apparatus of claim 12 wherein the waveguide-based interferometer has a weight less than 20 grams.

14. The apparatus of claim 13 wherein the first path and the second path equal to each other within a matching accuracy of 5 µm.

15. The apparatus of claim 14 wherein the matching accuracy changes in an amount equal to or less than 50 picometers for a temperature change of 1° C.

16. An apparatus for measuring spatial locations, the apparatus comprising:
   a first object at a first location;
   a second object at a second location;
   a waveguide-based interferometer coupled between the first object and the second object;
   wherein
      the waveguide-based interferometer comprising a waveguide material, the waveguide material being adapted to carry at least a first reference beam at a first frequency and a corresponding first wavelength, a second reference beam at a second frequency and a corresponding second wavelength, a first measurement beam at the first frequency and the corresponding first wavelength, and a second measurement beam at the second frequency and the corresponding wavelength;
      the first frequency is different from the second frequency;
      the first reference beam traverses a first reference path defined within the waveguide material;
      the second reference beam traverses a second reference path defined within the waveguide material;
      the first measurement beam traverses a first measurement path defined within the waveguide material and an external path defined outside of the waveguide material, the external path related to at least one of the first location and the second location;
      the second measurement beam traverses a second measurement path defined within the waveguide material;
      the first measurement path and the first reference path have a first common end;
      the second measurement path and the second reference path have a second common end.

17. The apparatus of claim 16 wherein the first measurement path and the second measurement path have a third common end and the first reference path and the second reference path have a fourth common end.

18. The apparatus of claim 17 wherein the first measurement path and the second measurement path equal to each other within a first accuracy of 5 µm.

19. The apparatus of claim 18 wherein the first accuracy changes in an amount equal to or less than 50 picometers for a temperature change of 1° C.

20. The apparatus of claim 17 wherein the first reference path and the second reference path equal to each other within a second accuracy of 5 µm or less.

21. The apparatus of claim 20 wherein the second accuracy changes in an amount equal to or less than 50 picometers for a temperature change of 1° C.

22. An apparatus for measuring spatial locations, the apparatus comprising:
   a first object at a first location;
   a second object at a second location;
   a waveguide-based interferometer coupled between the first object and the second object;
   wherein
      the waveguide-based interferometer comprising a waveguide material, the waveguide material being adapted to carry at least a first reference beam at a first frequency and a corresponding first wavelength, a second reference beam at a second frequency and a corresponding second wavelength, a first measurement beam at the first frequency and the corresponding first wavelength, and a second measurement beam at the second frequency and the corresponding wavelength;
      the first frequency is different from the second frequency;
      the first reference beam traverses a first reference path defined within the waveguide material;
      the second reference beam traverses a second reference path defined within the waveguide material;
      the first measurement beam traverses a first measurement path defined within the waveguide material and a first external path defined outside of the waveguide material, the first external path related to the first location;
      the second measurement beam traverses a second measurement path defined within the waveguide material and a second external path defined outside of the waveguide material, the second external path related to the second location;
      the first measurement path and the first reference path have a first common end;
      the second measurement path and the second reference path have a second common end.

23. The apparatus of claim 22 wherein the first measurement path and the second reference path have a third common end and the second measurement path and the first reference path have a fourth common end.

24. The apparatus of claim 23 wherein the first measurement path and the second reference path equal to each other within a first accuracy of 5 µm or less.

25. The apparatus of claim 24 wherein the first accuracy changes in an amount equal to or less than 50 picometers for a temperature change of 1° C.

26. The apparatus of claim 23 wherein the first reference path and the second reference path equal to each other within a second accuracy of 5 µm.

27. The apparatus of claim 26 wherein the second accuracy changes in an amount equal to or less than 50 picometers for a temperature change of 1° C.

28. The apparatus of claim 22 wherein the waveguide material being adapted to further carry at least a third reference beam and a fourth reference beam, the third reference beam traversing a third reference path defined within the waveguide material, the fourth reference beam traversing a fourth reference path defined within the waveguide material, the third reference path and the fourth reference path have a fifth common end, the third reference path diverges from the second reference path at a first diverging point, and the fourth reference path diverging from the first reference path at a second diverging point.

29. The apparatus of claim 28 wherein the third reference path, the second reference path and the second measurement path have the second common end.

30. The apparatus of claim 29 wherein the fourth reference path, the first reference path and the first measurement path have the first common end.

31. The apparatus of claim 30 wherein the third reference path and the fourth reference path equal to each other within a third accuracy of 5 $\mu$m or less.

32. The apparatus of claim 31 wherein the third accuracy changes in an amount equal to or less than 50 picometers for a temperature change of 1° C.

33. An apparatus for measuring spatial locations, the apparatus comprising:
 a first object at a first location;
 a waveguide-based interferometer coupled to the first object;
 wherein
  the waveguide-based interferometer comprising a waveguide material, the waveguide material being adapted to carry at least a first beam and a second beam;
  the first beam traverses a first path defined within the waveguide material;
  the second beam traverses a second path defined within the waveguide material and a third path defined outside of the waveguide material, the third path related to the first location.

34. The apparatus of claim 33 wherein an optical length of the first path and an optical length of the second path equal.

35. The apparatus of claim 33 wherein the first beam has a first frequency and the second beam has a second frequency, the first frequency equal to the second frequency.

* * * * *

UNITED STATES PATENT AND TRADEMARK OFFICE
CERTIFICATE OF CORRECTION

| | | |
|---|---|---|
| PATENT NO. | : 7,003,186 B2 | |
| APPLICATION NO. | : 10/680720 | |
| DATED | : February 21, 2006 | |
| INVENTOR(S) | : Raymond M. Bell Jr. et al. | |

It is certified that error appears in the above-identified patent and that said Letters Patent is hereby corrected as shown below:

Column 17, line 60, the "." after "C" should be deleted.

Signed and Sealed this

Twenty-fifth Day of July, 2006

JON W. DUDAS
*Director of the United States Patent and Trademark Office*